United States Patent [19]
Nakajima

[11] Patent Number: 6,043,977
[45] Date of Patent: Mar. 28, 2000

[54] INFORMATION PROCESSING APPARATUS HAVING A RECEPTACLE FOR REMOVABLY CONTAINING A FUNCTIONAL COMPONENT

[75] Inventor: Yuji Nakajima, Tokyo, Japan

[73] Assignee: Kabushiki Kaisha Toshiba, Kawasaki, Japan

[21] Appl. No.: 08/953,416

[22] Filed: Oct. 17, 1997

[30] Foreign Application Priority Data

Oct. 21, 1996 [JP] Japan ................................. 8-278224

[51] Int. Cl.⁷ ................................. G06F 1/16; G06F 1/20; H05K 7/20
[52] U.S. Cl. ........................ 361/687; 361/725; 312/223.2; 364/708.1
[58] Field of Search ..................... 361/687, 683, 361/724–727; 312/223.2; 364/708.1

[56] References Cited

U.S. PATENT DOCUMENTS

| | | | |
|---|---|---|---|
| 5,251,096 | 10/1993 | Hosoi et al. | 361/687 |
| 5,287,244 | 2/1994 | Hileman et al. | 361/687 |
| 5,581,443 | 12/1996 | Nakamura et al. | 361/687 |
| 5,617,301 | 4/1997 | Sato et al. | 312/223.2 |
| 5,731,952 | 3/1998 | Ohgami et al. | 361/687 |
| 5,748,444 | 5/1998 | Honda et al. | 361/687 |
| 5,784,256 | 7/1998 | Nakamura et al. | 361/687 |

Primary Examiner—Leo P. Picard
Assistant Examiner—Lisa Lea-Edmonds
Attorney, Agent, or Firm—Finnegan, Henderson, Farabow, Garrett & Dunner, L.L.P.

[57] ABSTRACT

An information processing apparatus such as a portable computer comprises a housing having an opening portion. A receptacle is formed within the housing. The receptacle communicates with the opening portion. An extension card is removably contained in the receptacle through the opening portion. The opening portion is covered by a cover. The cover is detachably attached to the housing by means of screws and covers the extension card. The housing body has a number of projections arranged to surround the receptacle. The projections are arranged at intervals along a periphery of the opening portion. Adjacent ones of the projections cooperate to constitute communication passages communicating with the receptacle within the housing.

17 Claims, 16 Drawing Sheets

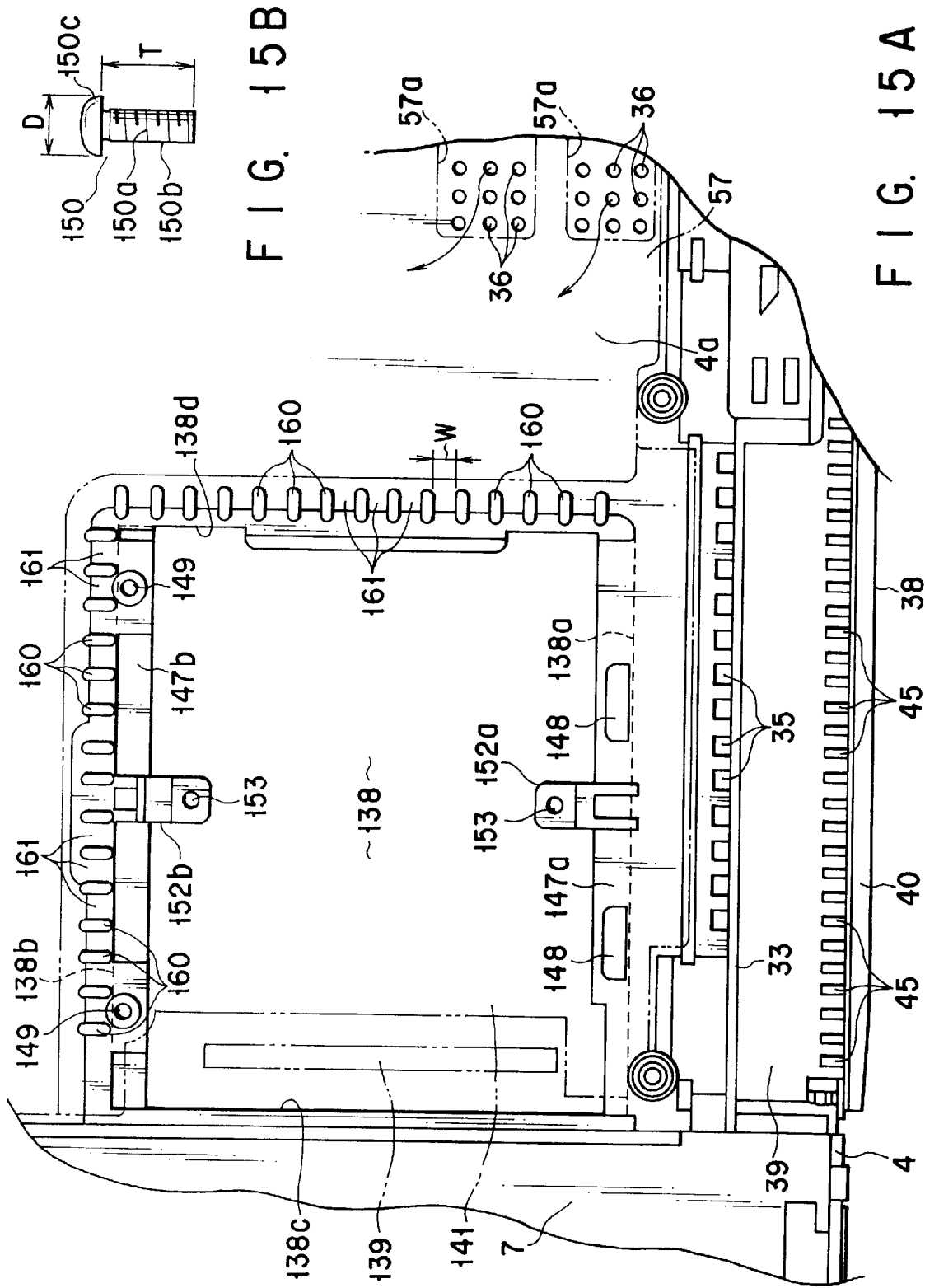

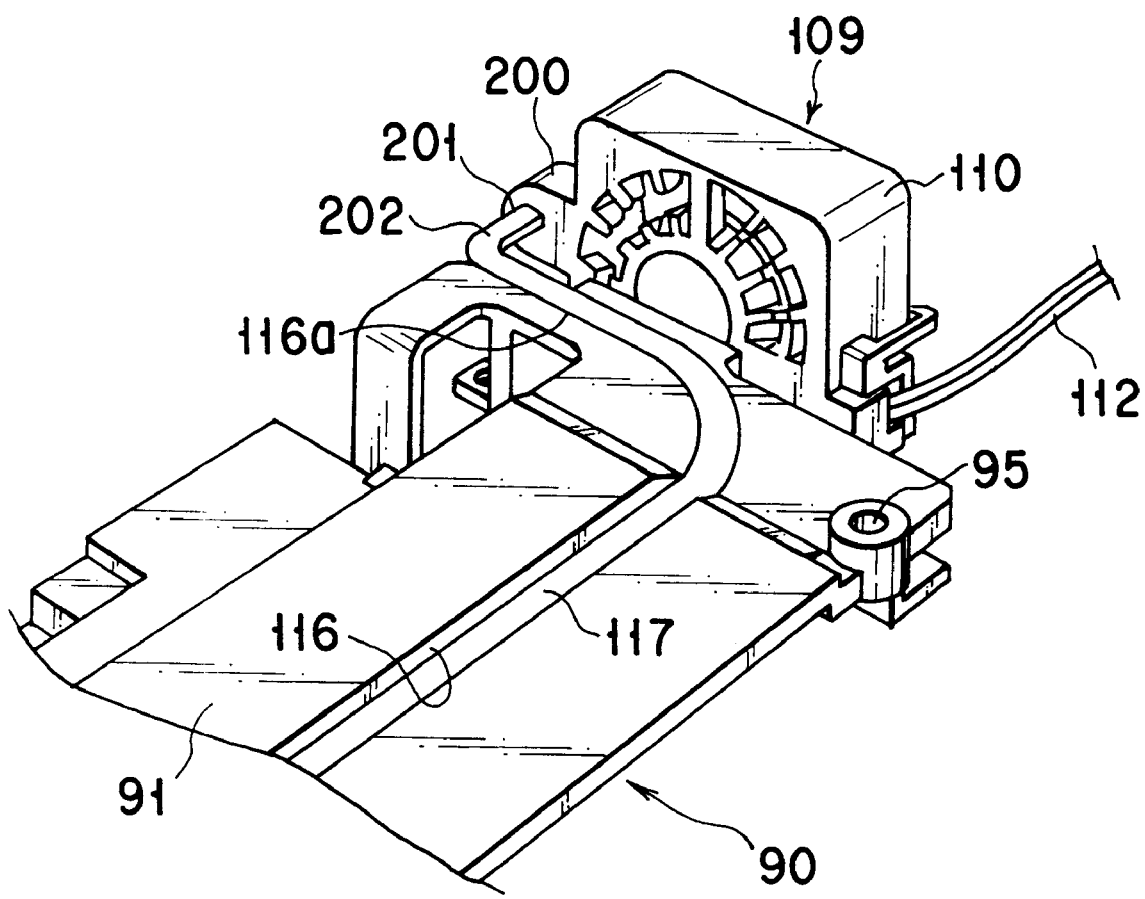
F I G. 16

INFORMATION PROCESSING APPARATUS HAVING A RECEPTACLE FOR REMOVABLY CONTAINING A FUNCTIONAL COMPONENT

BACKGROUND OF THE INVENTION

The present invention relates generally to an information processing apparatus capable of being additionally provided with a functional component such as a memory card, and more particularly to a structure of a receptacle for receiving the functional component.

There is known a "book-type" or "notebook-type" portable computer which can be additionally provided with a memory card for increasing a memory capacity. This type of portable computer has a box-shaped housing body. The housing body has a bottom wall and a peripheral wall continuous with the bottom wall. A circuit board is provided within the housing body. The circuit board faces the bottom wall of the housing body, and a card receptacle for removably receiving the memory card is formed between the circuit board and the bottom wall. The card receptacle has an opening portion for access to the memory card. This opening portion is open to the bottom wall of the housing body. The opening portion of the card receptacle is covered with a detachable cover. The cover is fixed to the bottom wall of the housing body by means of a plurality of screws. The memory card is hidden by this cover.

The circuit board has a bottom surface facing the opening portion. The bottom surface of the circuit board serves also as a ceiling of the card receptacle. The bottom surface of the circuit board is covered with an insulating sheet. A sealing material is adhered to the insulating sheet. The sealing material is formed of a soft material such as sponge and surrounds the opening portion. The sealing material is interposed between the circuit board and the bottom wall. Thus, the card receptacle is partitioned from the inside of the housing body by means of the insulating sheet and the sealing material. Even if a screw is accidentally dropped into the card receptacle while the cover is being removed from the housing body by turning the screw out of its place, this screw is received by the insulating sheet or sealing material and the screw stays in the card receptacle. Accordingly, the screw does not enter the housing body, and an undesired short-circuit or line breakage due to the screw can be prevented.

In the meantime, the performance of modern portable computers have greatly developed. In particular, the processing speed of CPUs mounted in the computers tends to increase more and more. With such an increase in processing speed of the CPUs, the power consumption of the CPUs increases and accordingly the amount of heat generated by the CPUs increases. Such a CPU is mounted on the circuit board and contained within the housing body. Thus, when the CPU with a great amount of heat emission is contained within the housing body, it is necessary to improve the ventilation of the inside of the housing body and to enhance the radiation performances of the CPU and circuit board.

There is a conventional method for enhancing the heat radiation of the CPU. In this method, the circuit board is provided with a heat sink through which heat of the CPU is naturally radiated to the inside of the housing body. In particular, in the case of a computer equipped with a CPU with a large heat emission, a motor fan is situated at a location adjacent to the heat sink. The motor fan forcibly feeds a cooling air to the surrounding of the heat sink.

As has been described above, the computer which can be additionally provided with the memory card has the card receptacle within the housing body. The card receptacle is defined as an independent chamber partitioned by the sealing material from the inside of the housing body. When air is let to flow within the housing body in order to improve the ventilation of the inside of the housing body, the air flow circumvents the card receptacle.

Consequently, the presence of the card receptacle disturbs the air flow within the housing body. In addition, the presence of the card receptacle makes irregular the distribution of air flow and makes it difficult to efficient flow the air in a wide area within the housing body. As a result, the ventilation of the inside of the housing body deteriorates, and heat may stay near the card receptacle or heat radiation of the CPU and/or circuit board becomes deficient.

BRIEF SUMMARY OF THE INVENTION

A first object of the present invention is to provide an information processing apparatus wherein ventilation of the inside of a housing body can be enhanced, while the presence of a receptacle does not prevent air from flowing within the housing body.

A second object of the present invention is to provide an information processing apparatus wherein the ventilation can be enhanced, as described in connection with the first object, and a screw, even if accidentally dropped into the receptacle, is prevented from entering the housing body, without providing special components for preventing the entering, thus reducing the manufacturing cost and simplifying the structure of the housing body.

In order to achieve the first object, there is provided an information processing apparatus comprising:

a housing having an opening portion;

a receptacle formed within the housing;

a functional component removably contained in the receptacle through the opening portion; and a cover closing the opening portion and covering the functional component, wherein the housing body has a number of projections which protrude from an inner surface of the housing toward the receptacle and are arranged at intervals along a periphery of the opening portion.

In the above structure, the receptacle communicates with the inside of the housing via the communication passages. Thus, air flowing within the housing by natural convection or forcible feeding passes through the receptacle via the communication passages. Accordingly, the flow of air within the housing body is neither prevented nor disturbed by the presence of the receptacle. The air can be let to flow uniformly over a wide area of the inside of the housing. Therefore, the ventilation of the inside of the housing is enhanced, and heat does not locally stay in the vicinity of the receptacle.

In addition, since the air passes through the receptacle, the functional component can be cooled by the air. Therefore, the radiation properties of the functional component can be enhanced.

In order to achieve the first object, there is also provided an information processing apparatus comprising:

a housing having an opening portion;

a receptacle provided within the housing body and being continuous with the opening portion, the receptacle having walls arranged to surround the opening portion and a plurality of communication holes formed in the walls, the communication holes making the receptacle communicate with the inside of the housing body;

a card-type electronic component removably contained in the receptacle via the opening portion; and a cover attached to the housing, the cover closing the opening portion and covering the card-type electronic component.

In the above structure, the receptacle communicates with the inside of the housing via the communication holes. Thus, air flowing within the housing body by natural convection or forcible feeding passes through the receptacle via the communication holes. Accordingly, the flow of air within the housing is neither prevented nor disturbed by the presence of the receptacle. The air can be let to flow uniformly over a wide area within the inside of the housing body. Therefore, the ventilation of the inside of the housing is enhanced, and heat does not locally stay in the vicinity of the receptacle.

In addition, since the air passes through the receptacle, the card-type electronic component can be cooled by the air. Therefore, the radiation properties of the card-type electronic component can be enhanced.

In order to achieve the first object, there is provided an information processing apparatus comprising:

a housing in which a plurality of vent holes are formed;

a receptacle provided within the housing, the receptacle having a reception space separated from an inside space of the housing body by means of a partition wall and having a plurality of communication passages formed in the partition wall, the communication passages making the reception space communicating with the inside space of the housing body;

a functional component contained in the reception space of the receptacle; and a motor fan contained within the housing, the motor fan sucking air into the inside space via the vent holes, the receptacle being situated between the motor fan and the vent holes.

In the above structure, the air sucked into the housing via the vent holes flows to the motor fan. The receptacle is situated in the flow passage of the air. Since the reception space of the receptacle communicates with the inside of the housing via the communication passages, the air passes through the receptacle via the communication passages. Accordingly, the flow of air within the housing is neither prevented nor disturbed by the presence of the receptacle. The air can be let to flow uniformly over a wide area within the inside of the housing. Therefore, the ventilation of the inside of the housing is enhanced, and heat does not locally stay in the vicinity of the receptacle.

In addition, since the air passes through the receptacle, the ventilation of the receptacle is enhanced. Therefore, the functional component can be cooled by the air, and the radiation properties of the functional component can be enhanced.

In order to achieve the second object of the invention, there is provided an information processing apparatus comprising:

a housing having an opening portion;

a receptacle provided within the housing, said receptacle communicating with the opening portion and having a number of projections which protrude from an inner surface of the housing toward the receptacle and are arranged at intervals along a periphery of the opening portion;

a functional component removably contained in the receptacle through the opening portion;

a cover closing the opening portion and covering the functional component;

screws detachably attaching the cover to the housing, each of said intervals between adjacent ones of the projections being shorter than the dimension of the screws.

In the above structure, the receptacle communicates with the inside of the housing, via the communication holes. Thus, air flowing within the housing by natural convection or forcible feeding passes through the receptacle via the communication holes. Accordingly, the flow of air within the housing is neither prevented nor disturbed by the presence of the receptacle. The air can be let to flow uniformly over a wide area of the inside of the housing. Therefore, the ventilation of the inside of the housing is enhanced, and heat does not locally stay in the vicinity of the receptacle.

In addition, since the air passes through the receptacle, the functional component can be cooled by the air. Therefore, the radiation properties of the functional component can be enhanced.

Furthermore, even if a screw is accidentally dropped into the receptacle while it is being unscrewed in order to remove the cover from the housing, the screw is caught at the edges of the communication holes. Thus, the screw can be received by the wall and can be prevented from entering the housing. Besides, according to the above structure, it should suffice if holes are formed in the walls defining the receptacle. Since there is no need to provide a special member for receiving the screw, the number of parts can be reduced and the structure of the housing can be simplified.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 15A is a plan view of a bottom wall to which the opening portion of the card receptacle opens;

FIG. 15B is a side view of a screw for fixing the cover to the housing body; and FIG. 16 is a perspective view of a heat sink according to a second embodiment of the present invention.

DETAILED DESCRIPTION OF THE INVENTION

A first embodiment of the present invention, in which the invention is applied to a portable computer, will now be described with reference to FIGS. 1 through 15A and 15B.

Figure 1:
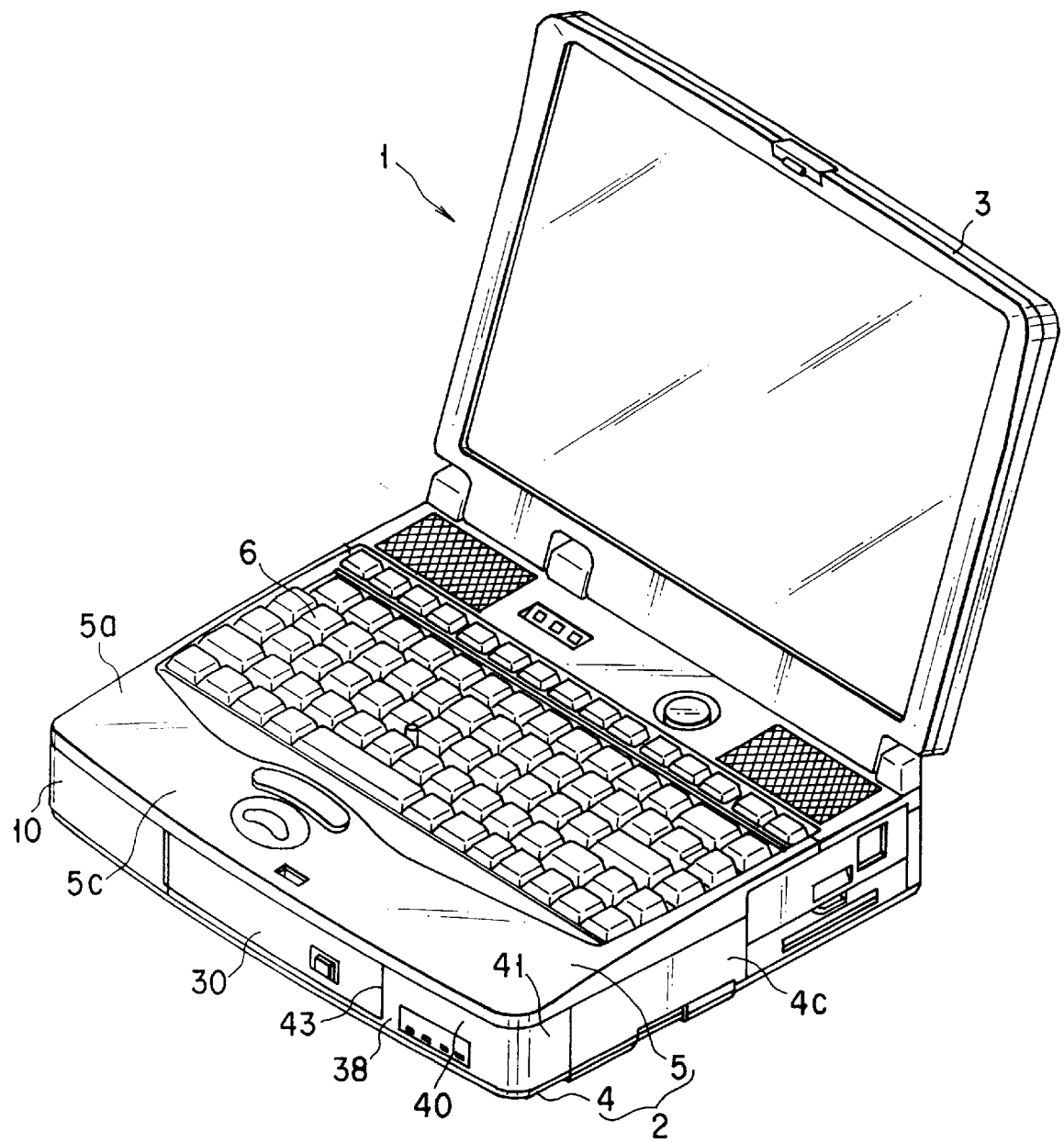
FIG. 1 is a perspective view showing a portable computer according to a first embodiment of the present invention.

FIG. 1 shows a book-type portable computer 1. The computer 1 comprises a housing body 2 of a synthetic resin and a display unit 3 supported on the housing body 2.

Figure 2:
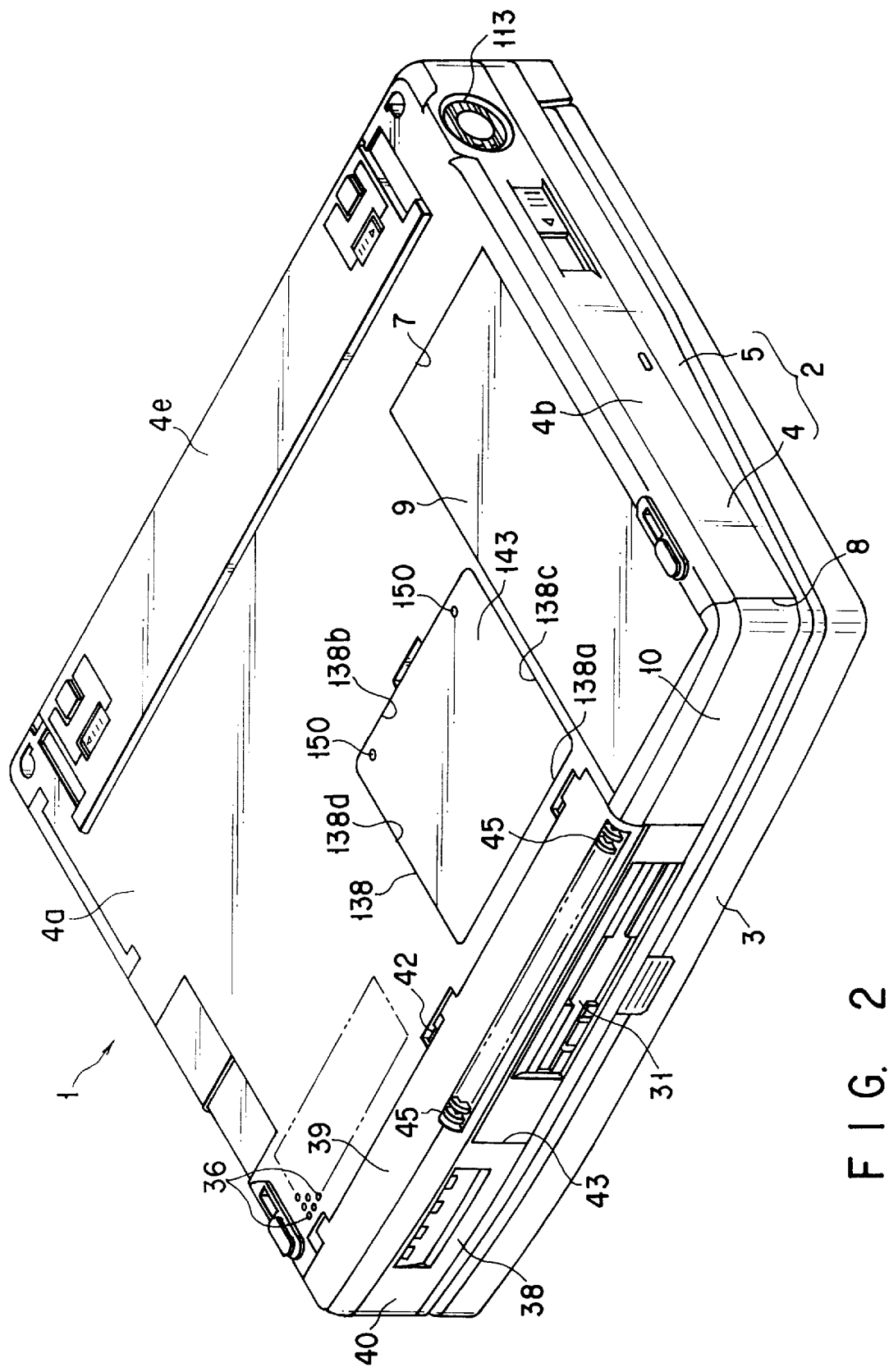
FIG. 2 is a perspective view showing the lower side of a housing body of the portable computer.
Figure 3:
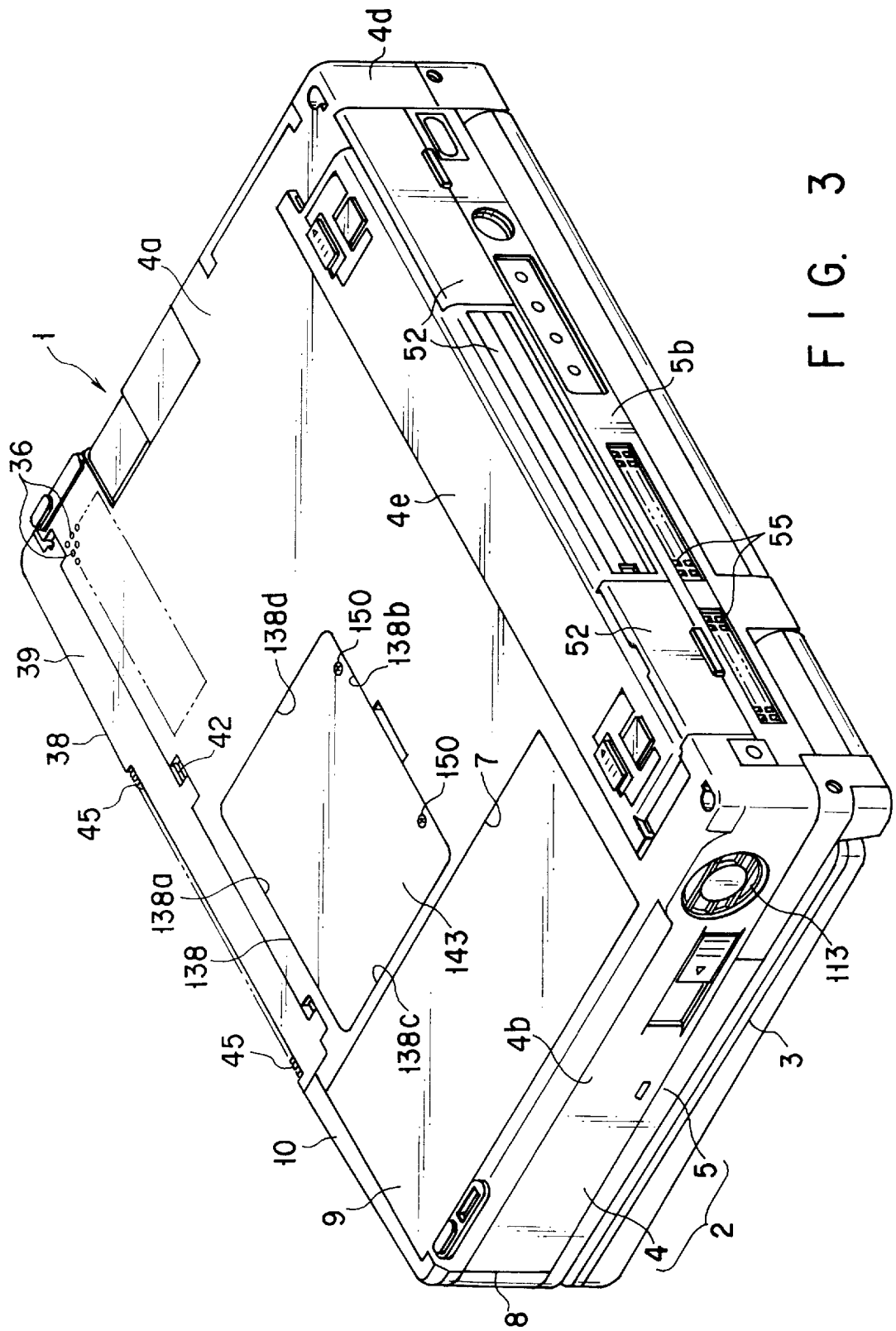
FIG. 3 is a perspective view showing the lower side of the housing body of the portable computer.

As is shown in FIGS. 2 and 3, the housing body 2 comprises a base 4 and an upper cover 5 coupled to the base 4. The base 4 has a bottom wall 4a, a pair of side walls 4b and 4c and a rear wall 4d. The bottom wall 4a has a projecting portion 4e at its rear part. The projecting portion 4e serves to tilt the housing body 2 such that a front part thereof is situated at a lower level. The projecting portion 4e projects downward from the bottom wall 4a and extends in the width direction of the base 4. Accordingly, as is clear from FIG. 6, the depth dimension of the rear part of the base 4 is greater than that of the front part thereof by a degree corresponding to the projecting portion 4e.

The upper cover 5 has an upper wall 5a and a rear wall 5b. The upper wall 5a faces the bottom wall 4a of the base 4. The side edge portions of the upper wall 5a are continuous with the side walls 4b and 4c of the base 4. The rear wall 5b of upper cover 5 extends downward from the rear end portion of upper wall 5a. The rear wall 5b is continuous with the rear wall 4d of the base 4. The bottom wall 4a, side walls 4b and 4c, rear wall 4d, upper wall 5a and rear wall 5b cooperate to constitute the outer walls of the housing body 2. Thus, the housing body 2 has a flat, rectangular box-like shape opening to the front side. A front part of the upper wall 5a of the upper cover 5 serves also as a palm rest 5c. The palm rest 5c extends in the width direction of the housing body 2. A keyboard 6 is situated in rear of the palm rest 5c.

Figure 4:
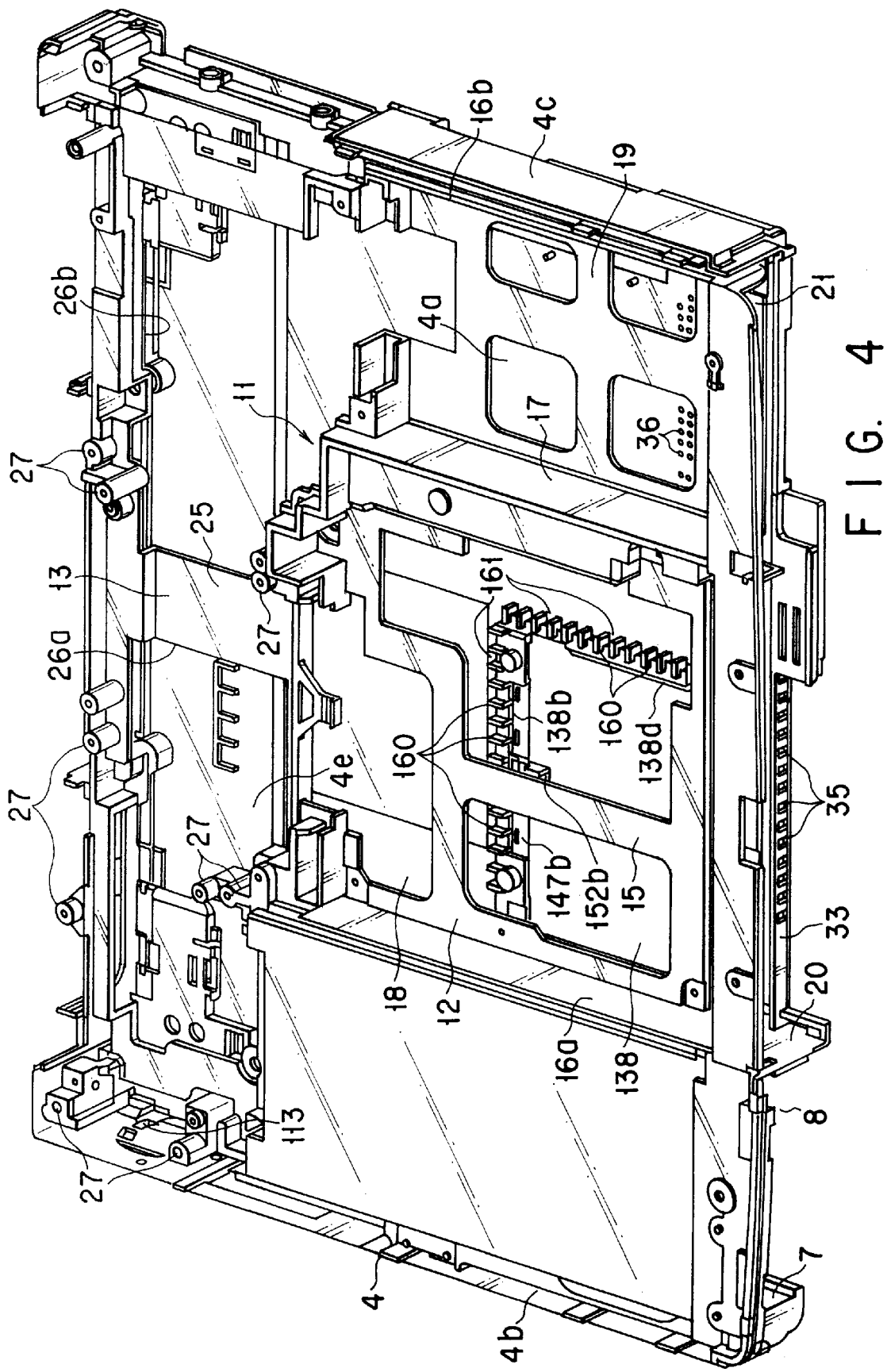
FIG. 4 is a perspective view showing the state in which a frame is mounted on a base of the housing body.

As is shown in FIGS. 2 to 4, the base 4 includes a battery receptacle 7. The battery receptacle 7 is defined by a recess opening to the bottom wall 4a of base 4. The battery receptacle 7 is situated in a left-hand end portion of the base 4. The battery receptacle 7 has an insertion hole 8 opening to the front side of the base 4.

A battery pack 9 is detachably mounted in battery receptacle 7 through the insertion hole 8. The battery pack 9 functions as a driving power supply when the computer 1 is used in a location where a commercial AC power supply is not available. The insertion hole 8 of battery receptacle 7 is covered with a removable battery cover 10. The battery cover 10 is removably engaged with the base 4, whereby the battery pack 9 is held in the battery receptacle 7.

As is shown in FIG. 4, a frame 11 is contained within the base 4. The frame 11 is formed of a metallic material with a light weight and heat conductivity, such as an magnesium alloy. The frame 11 has such a size that it can be tightly fitted within the base 4. The frame 11 integrally comprises a device storage portion 12 and a board support portion 13. The device storage portion 12 is located in a front half portion of the frame 11. The device storage portion 12 has a bottom wall 15 and a pair of side walls 16a and 16b continuous with the bottom wall 15. The bottom wall 15 faces the bottom wall 4a of base 4.

The device storage portion 12 is divided into a first section 18 and a second section 19 by means of a partition wall 17. The first section 18 and second section 19 are arranged in the width direction of the base 4. The first and second sections 18 and 19 have insertion holes 20 and 21, respectively. The insertion holes 20 and 21 are located at the front edge of the base 4.

Figure 5:
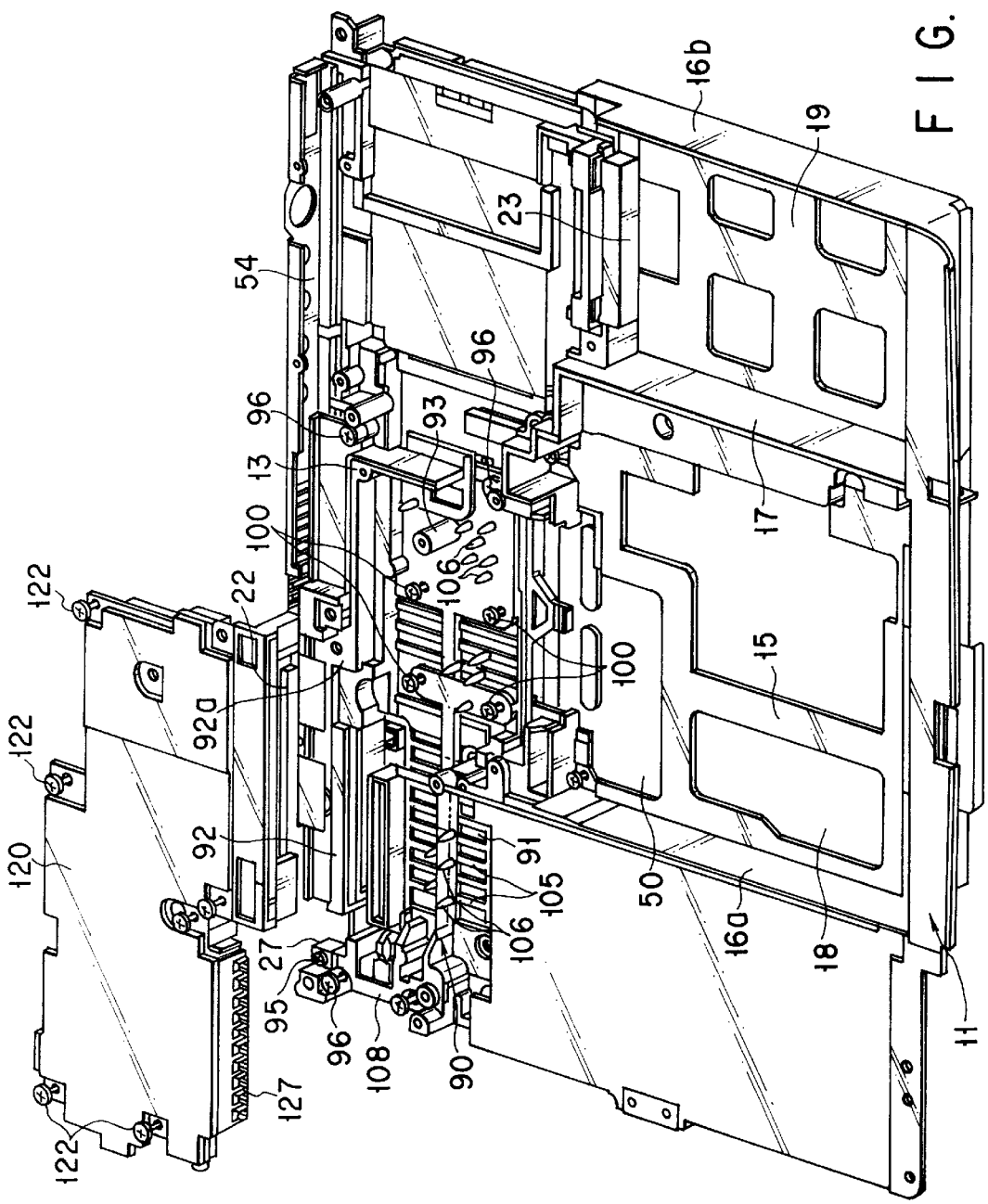
FIG. 5 is a perspective view showing the positional relationship between a heat sink attached to the frame and a second circuit board.
Figure 6:
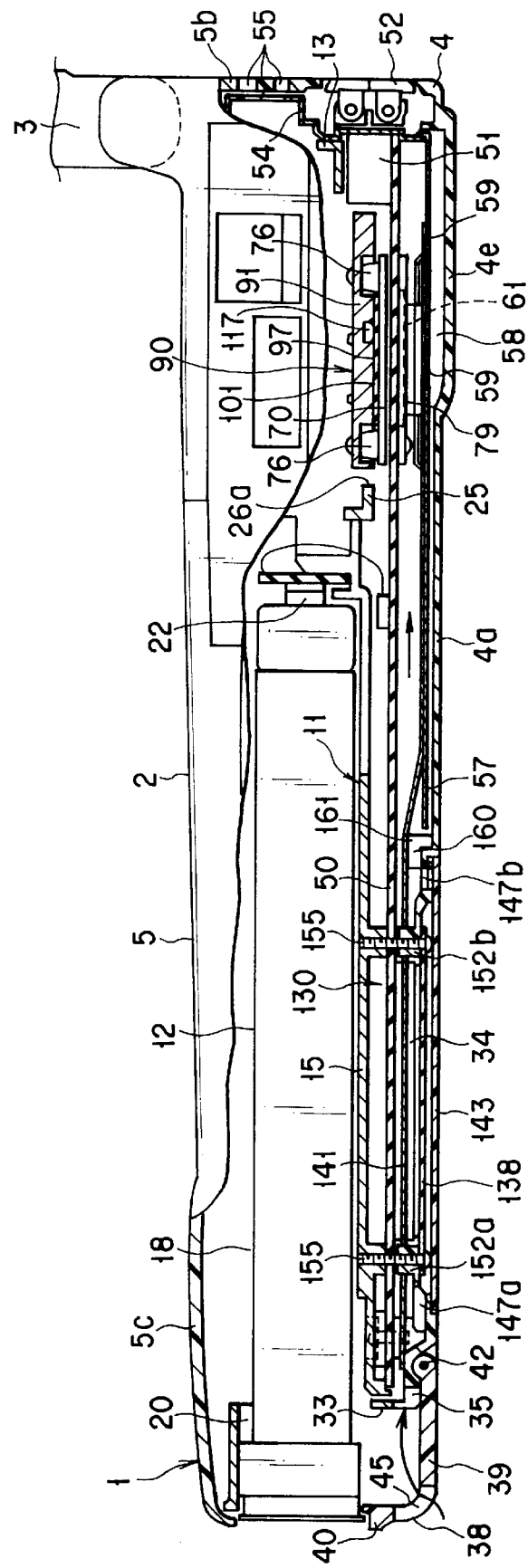
FIG. 6 is a cross-sectional view of the portable computer, illustrating a flow passage of air within the housing body.

As is shown in FIGS. 5 and 6, interface connectors 22 and 23 are arranged in the first and second sections 18 and 19, respectively. The interface connectors 22 and 23 are located at terminal end portions of the first and second sections 18 and 19 so as to face the insertion holes 20 and 21, respectively.

As is shown in FIGS. 4 and 6, the board support portion 13 of frame 11 is located behind the battery receptacle 7 and device storage portion 12. The board support portion 13 has a bottom wall 25 which faces the projecting portion 4e of base 4. The bottom wall 25 has a pair of relatively large through-holes 26a and 26b. A plurality of upwardly extending boss portions 27 are provided on an upper surface of the bottom wall 25. The boss portions 27 are arranged around the through-holes 26a and 26b.

One of a CD-ROM drive 30 (shown in FIG. 1) and a floppy-disk drive (FDD) 31 (shown in FIG. 2) is selectively and detachably mounted in the first section 18 of device storage portion 12. The CD-ROM drive 30 and FDD 31 are packaged as modules, respectively. The CD-ROM drive 30 or FDD 31 is inserted into the first section 18 through the insertion hole 20. The CD-ROM drive 30 or FDD 31 is electrically connected to the interface connector 22.

A hard disk drive (HDD) (not shown) is mounted in the second section 19 of device storage portion 12. The HDD is detachably inserted into the second section 19 through the insertion hole 21 and electrically connected to the interface connector 23.

As is shown in FIGS. 4 and 6, the bottom wall 4a of base 4 includes an upright wall 33 extending upward from a front end portion of the bottom wall 4a. The upright wall 33 is continuous with a front end portion of the bottom wall 15 of the device storage portion 12. The upright wall 33 has a number of first vent holes 35. The first vent holes 35 are arranged linearly at intervals in the width direction of the base 4. The first vent holes 35 are provided at positions corresponding to the insertion hole 20 of the first section 18.

As is shown in FIGS. 2 and 3, the bottom wall 4a of base 4 has a number of second vent holes 36 in its front end portion. The second vent holes 36 are located below the second section 19 of device storage portion 12.

As is shown in FIGS. 1, 2 and 6, a front cover 38 is attached to the front end portion of base 4. The front cover 38 has a bottom wall portion 39, a front wall portion 40 continuous with the bottom wall portion 39, and a side wall portion 41 continuous with the bottom wall portion 39 and front wall portion 40. The bottom wall portion 39 and front wall portion 40 extend in the width direction of the base 4. The bottom wall portion 39 is rotatably supported by means of a pin 42 to the front end portion of the bottom wall 4a of base 4. Accordingly, the front cover 38 is rotatable between a first position where the front wall portion 40 thereof faces the insertion holes 20 and 21 of device storage portion 12, and a second position where the front wall portion 40 is accidentally dropped in front of the insertion holes 20 and 21. When the front cover 38 is rotated to the first position, the bottom wall portion 40 is continuous with the bottom wall 4a of base 4, and the side wall portion 41 is continuous with the right-hand side wall 4c of base 4.

Figure 13:
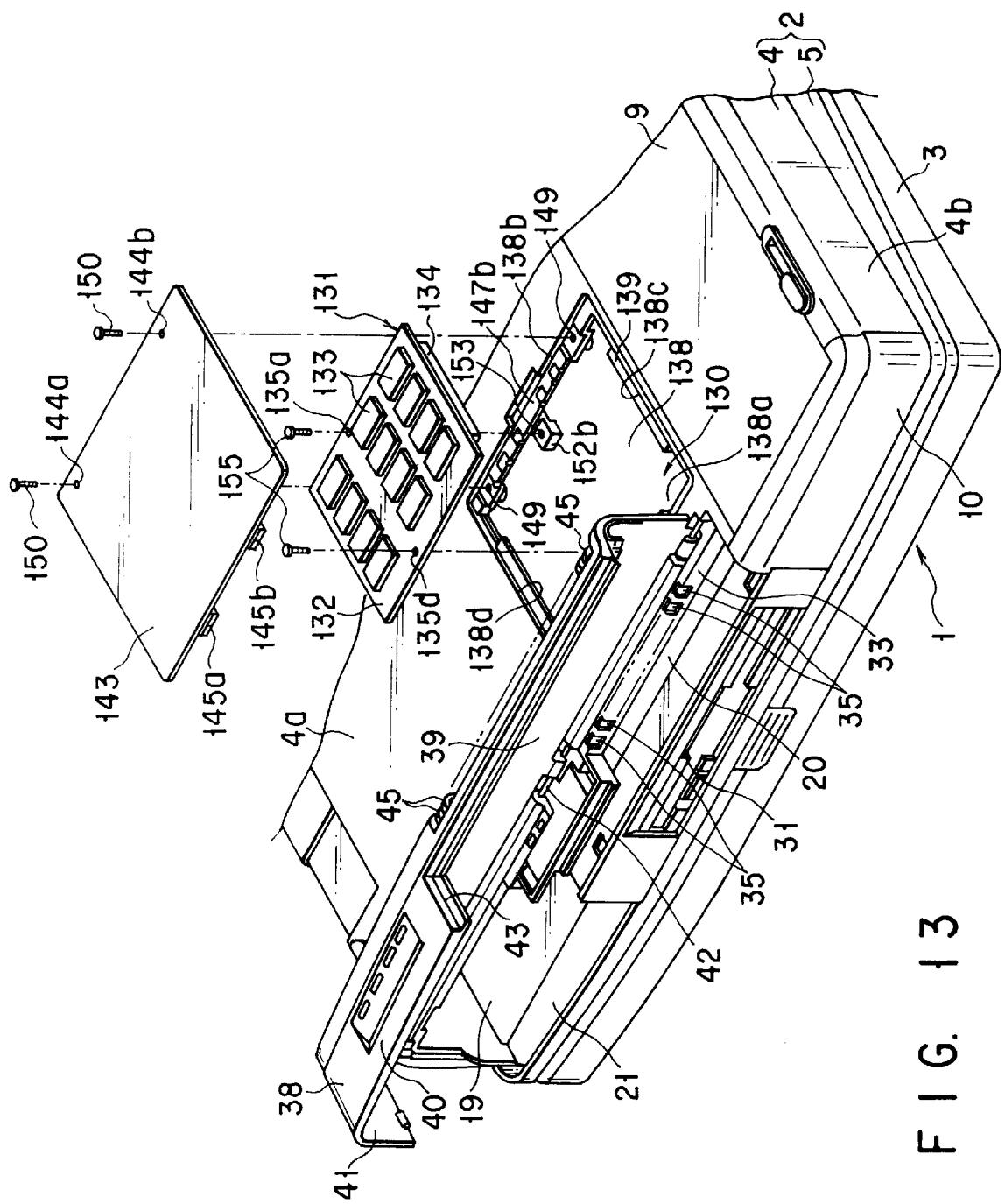
FIG. 13 is a perspective view of the portable computer showing the state in which a cover is removed from an opening portion of a card receptacle.

As is most clearly shown in FIG. 13, the front wall portion 40 of front cover 38 has a guide hole 43. The guide hole 43 has a rectangular shape corresponding to the size of the front face of the CD-ROM drive 30 or FDD 31. Even in the state in which the front cover 38 is set in the first position, the front face of the CD-ROM drive 30 or FDD 31 is exposed to the front side of the base 4 and the CD-ROM drive 30 or FDD 31 can be accessed.

The front cover 38 has a number of through-holes 45. The through-holes 45 are formed in a corner portion defined by the bottom wall portion 39 and front wall portion 40 of front cover 38. The through-holes 45 are linearly arranged at intervals in the width direction of the base 4. When the front cover 38 is set in the first position, the through-holes 45 face the first vent holes 35 in the base 4.

As is shown in FIG. 6, a first circuit board 50 is supported on a lower end portion of the frame 11. The first circuit board 50 has such a size as to cover, from below, the device storage portion 12 and board support portion 13 of frame 11. The first circuit board 50 along with the frame 11 is contained within the base 4. The first circuit board 50 faces the bottom wall 4a of base 4 and defines an air passage 34 between itself and the bottom wall 4a. Accordingly, the second vent holes 36 in the bottom wall 4a communicate with the air passage 34.

A plurality of extension connectors 51 are mounted on an upper surface of a rear end portion of the first circuit board 50. The extension connectors 51 are used for connection with peripheral devices such as a printer, an external keyboard and an extension station. The extension connectors 51 are arranged adjacent to the rear wall 4d of base 4. The rear wall 4d is partially cut out at a region corresponding to the extension connectors 51. The rear wall 4d has a plurality of connector covers 52. The connector covers 52 are supported on the rear wall 4d rotatably between a position where the extension connectors 51 are exposed to the outside of the housing body 2 and a position where the extension connectors 51 are hidden.

As is shown in FIGS. 5 and 6, a metallic connector panel 54 is attached to the rear end portion of the first circuit board 50. The connector panel 54 extends upward from the first circuit board 50 and supports the extension connectors 51. An upper portion of the connector panel 54 is superposed on the inner surface of the rear wall 5b of upper cover 5. A number of ventholes 55 communicating with the inside of the housing body 2 are formed in the connector panel 54 and rear wall 5b.

As is shown in FIG. 6, a metallic shield plate 57 is screwed down on the upper surface of the bottom wall 4a of base 4. The shield plate 57 faces the lower surface of the first circuit board 50 and is exposed to the air passage 34. The shield plate 57 has a plurality of escape holes 57a, as shown in FIG. 15A. The escape holes 57a communicate with the second vent holes 36 in the bottom wall 4a. A rear portion of the shield plate 57 is led to a region between the projecting portion 4e of base 4 and the board support portion 13 of frame 11. A space 58 is defined between the rear portion of the shield plate 57 and the projecting portion 4e. The space 58 extends in the width direction of the base 4. The shield plate 57 has a plurality of through-holes 59 through which the air passage 34 and the space 58 communicate with each other.

Figure 7:
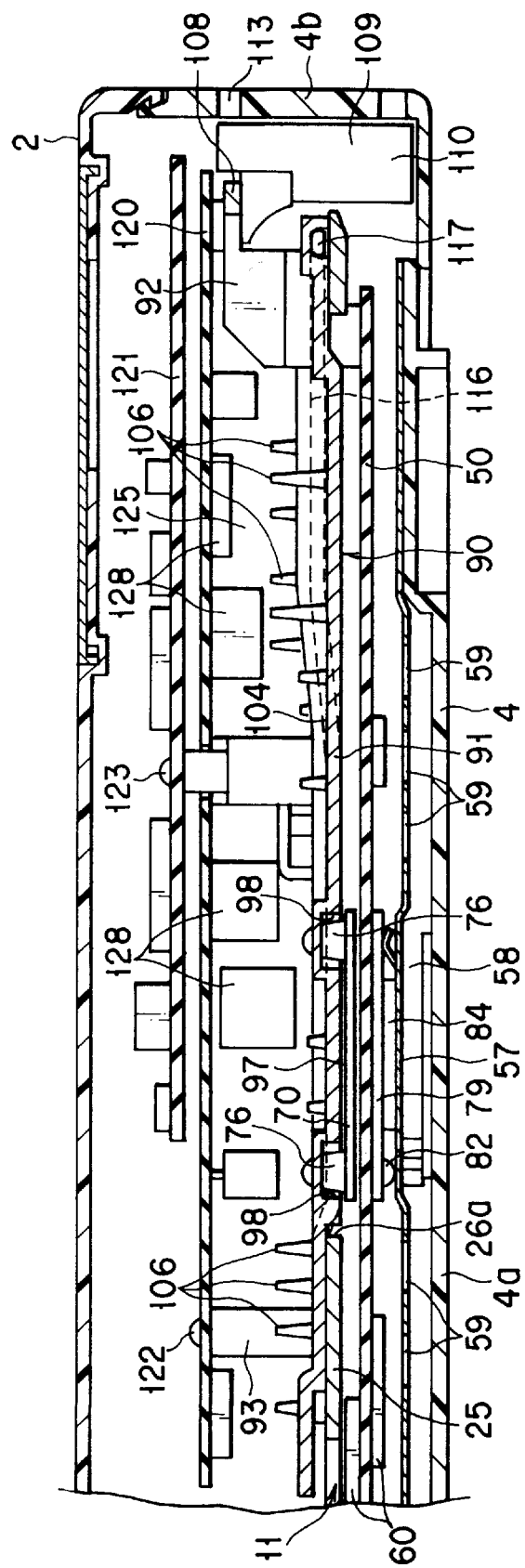
FIG. 7 is a cross-sectional view of the portable computer, showing the positional relationship between a cold plate and a heat sink.

As is shown in FIG. 7, various circuit elements 60 such as DRAMs are mounted on the upper and lower surfaces of the first circuit board 50. A TCP (Tape Carrier Package) 61, or a circuit component constituting the CPU, is mounted on the lower surface of the rear end portion of first circuit board 50. The TCP 61 is situated in rear of the first section 18 of device storage portion 12 and below the board support portion 13. The power consumption of the TCP 61 in operation is high in accordance with a high processing speed of the computer 1. Accordingly, the heat emission of the TCP 61 is very great.

Figure 8:
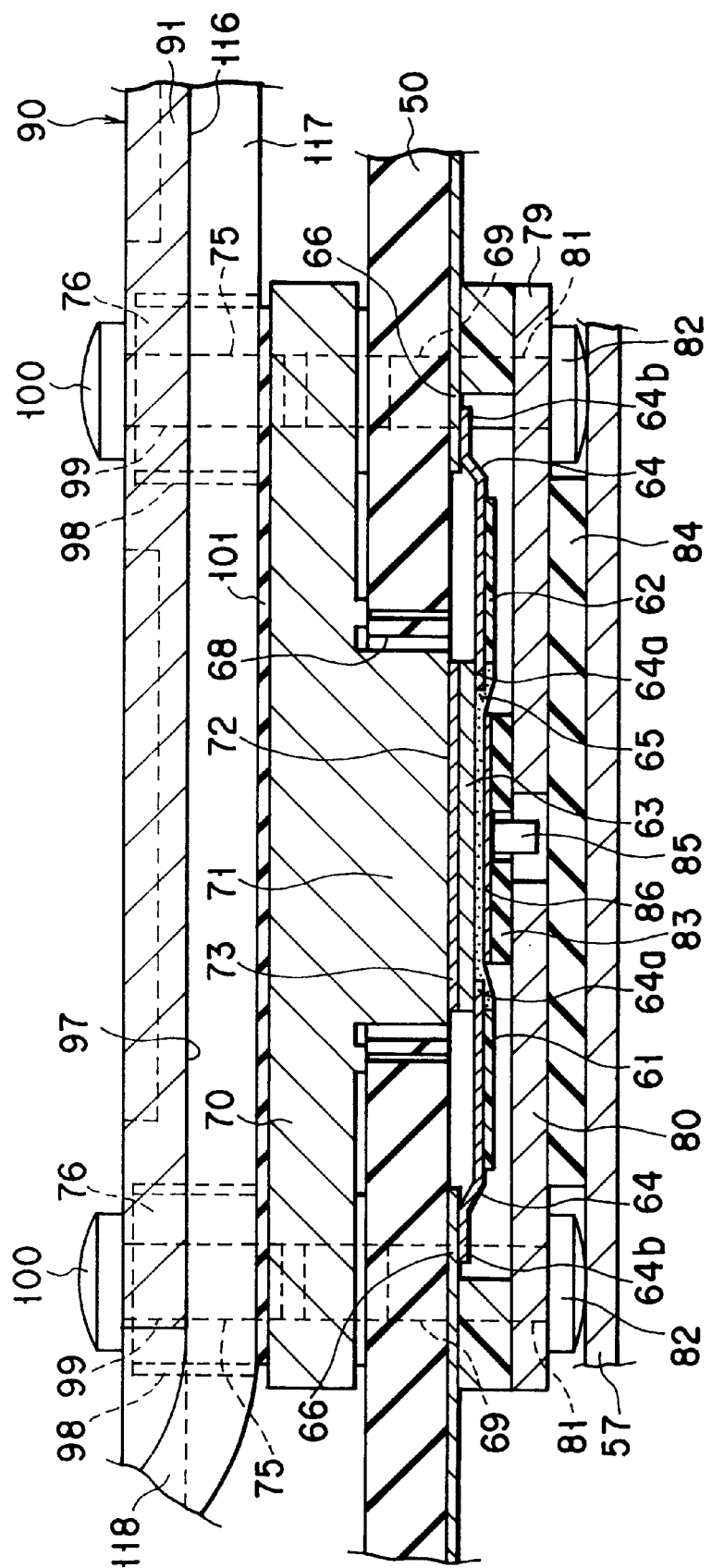
FIG. 8 is a cross-sectional view showing the positional relationship among a TCP (Tape Carrier Package) mounted on the circuit board, cold plate and TCP cover.
Figure 9:
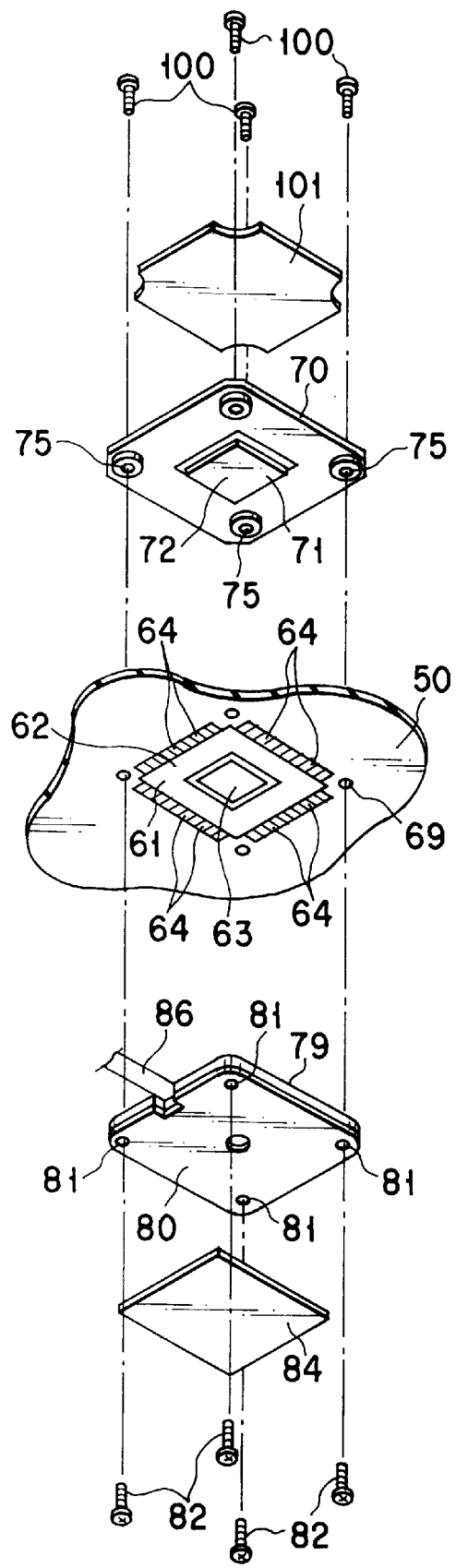
FIG. 9 is a perspective view showing the positional relationship among the TCP, cold plate, circuit board and TCP cover.

As is shown in FIGS. 8 and 9, the TCP 61 comprises a carrier 62 and an IC chip 63. The carrier 62 is formed of a soft resin film and has a rectangular shape with four edge portions. The IC chip 63 is supported on a central portion of the carrier 62 and has a very high heat emission in operation. The carrier 62 includes a number of leads 64 formed of copper foil. Each lead 64 has a first end portion 64a and a second end portion 64b. The first end portion 64a is soldered to a bump on the IC chip 63. A region of soldering between the first end portion 64a and IC chip 63 is covered with a potting resin 65. The second end portion 64b of each lead 64 is led out from the edge portion of the carrier 62.

The TCP 61 is mounted on the lower surface of the first circuit substrate 50 in a so-called "face-up" position in which the soldering portions between the leads 64 and IC chip 63 are situated on the side opposite to the side of the first circuit board 50. A number of pads 66 are arranged on the lower surface of the first circuit board 50. These pads 66 are soldered to the second end portions 64b of leads 64.

Figure 10:
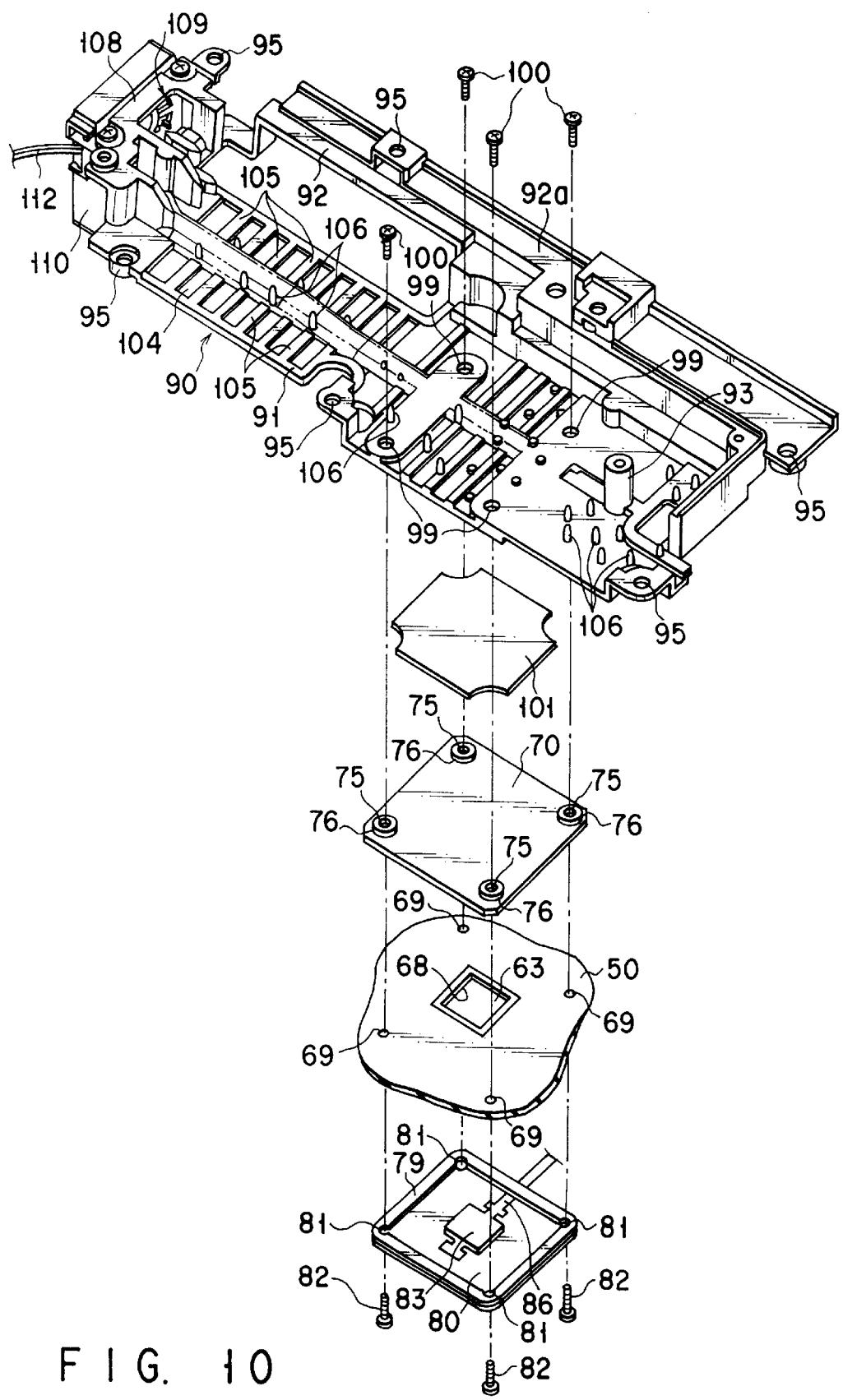
FIG. 10 is a perspective view showing the positional relationship among the heat sink, cold plate, circuit board and TCP cover.

As is shown in FIG. 10, the first circuit board 50 has a square passage-hole section 68 including four corner portions. The passage-hole section 68 is located at a position where the TCP 61 is mounted and faces the IC chip 63. The passage-hole section 68 has an opening size greater than the IC chip 63. The first circuit board 50 has four through-holes 69. The through-holes 69 are formed adjacent to the corner portions of the passage-hole section 68 and are located outside the mounting region of the TCP 61.

A cold plate 70 for receiving heat from the TCP 61 is situated over the upper surface of the first circuit board 50. The cold plate 70 is formed of a copper-based alloy material having high heat conductivity. The cold plate 70 has a rectangular shape with four corner portions. A heat receiving portion 71 projecting downward is formed on a central area of the lower surface of the cold plate 70. The heat receiving portion 71 is fitted in the passage-hole section 68 of the first circuit board 50. The lower surface of the heat receiving portion 71 serves as a heat receiving surface 72. The heat receiving surface 72 is adhered to the upper surface of the IC chip 63 by means of an adhesive 73.

The cold plate 70, as shown in FIG. 10, has columnar boss portions 76 on corner areas of its upper surface. Each boss portion 76 has a screw hole 75. The screw hole 75 is open to the upper surface of the boss portion 76 and to the lower surface of the cold plate 70. These screw holes 75 communicate with the through-holes 69 of the first circuit board 50.

As is shown in FIGS. 8 to 10, a TCP cover 79 is provided below the lower surface of the first circuit board 50. The TCP cover 79 protects the TCP 61 and also covers and protects the soldering portions between the leads 64 of TCP 61 and the circuit board 50. The TCP cover 79 has a cover panel 80. The cover panel 80 is formed of a metallic material with high heat conductivity, such as an aluminum alloy. The cover panel 80 has a rectangular shape with four corner portions. A central portion of the upper surface of the cover panel 80 is opposed to the IC chip 63.

The cover panel 80 has through-holes 81 in its corner portions. The through-holes 81 communicate with the through-holes 69 in the first circuit board 50. Screws 82 are inserted into the through-holes 81 from the bottom side of the first circuit board 50. The screws 82 are further inserted through the through-holes 69 and turned into the screw holes 75 in the cold plate 70. Thus, the cold plate 70 and TCP cover 79 are held on the first circuit board 50.

As is shown in FIGS. 8 and 10, an elastic sheet 83 having heat conductivity is adhered to the central area of the upper surface of cover panel 80. The elastic sheet 83 is formed of a rubber-like elastic material which is obtained by adding alumina to a silicone resin. The elastic sheet 83 is sandwiched between the cover panel 80 and IC chip 63. Accordingly, heat produced from the IC chip 63 is conducted to the cover panel 80 through the elastic sheet 83.

As is most clearly shown in FIG. 8, the lower surface of the cover panel 80 is opposed to the shield plate 57. An elastic sheet 84 having heat conductivity is interposed between the cover panel 80 and shield plate 57. The elastic sheet 84 is formed of a rubber-like elastic material which is obtained by adding alumina to a silicone resin. The elastic sheet 84 is put in contact with the cover panel 80 and shield plate 57. The heat of IC chip 63 conducted to the cover panel 80 is led to the shield plate 57 via the elastic sheet 84.

The cover panel 80 has a thermistor 85 for measuring the temperature of the IC chip 64. The thermistor 85 is supported on a flexible wiring board 86 (see FIG. 10) and embedded in the elastic sheet 83. The thermistor 85 is situated at a central portion of the cover panel 80. Accordingly, the thermistor 85 is designed to measure the temperature of, in particular, the cover panel 80 which is thermally affected by the IC chip 63.

As is shown in FIGS. 9 and 10, the wiring board 86 is led out of the cover panel 80. A distal end portion of the wiring board 86 is connected to the first circuit board 50. Thus, information on the temperature of the cover panel 80 measured by the thermistor 85 is input to a control circuit (not shown) provided on the first circuit board 50.

As is shown in FIGS. 6 and 7, the cold plate 70 faces the through-hole 26a in the bottom wall 25 of frame 11. A heat sink 90, as shown in FIG. 10, is attached to the bottom wall 25 of the frame 11. The heat sink 90 is formed of a metallic material, such as an aluminum alloy, having a heat conductivity higher than that of the frame 11. The heat sink 90 has a radiation panel 91. The radiation panel 91 has a rectangular shape elongated in the width direction of the base 4. The radiation panel 91 covers, from above, the through-hole 26a. The radiation panel 91 integrally comprises a board support wall 92 and a support column 93. The board support wall 92 extends upward from a rear edge portion and a side edge portion of the radiation panel 91. The board support wall 92 has a flat flange portion 92a at its upper end portion. The support column 93 extends upward from a right-hand end portion of the radiation panel 91. The top surface of the support column 93 is on a level with that of the flange portion 92a.

A plurality of attachment seats 95 are integrally provided on a peripheral edge portion of the radiation panel 91. The attachment seats 95 are arranged at positions corresponding to the boss portions 27 of board support portion 13. These attachment seats 95, as shown in FIG. 5, are fixed on the upper ends of the boss portions 27 by means of screws 96. Thereby, the heat sink 90 is coupled to the board support portion 13 of frame 11, and the radiation panel 91 of heat sink 90 is placed over the bottom wall 25 of board support portion 13. A small gap (not shown) is provided between the heat sink 90 and board support portion 13, except contact portions between the attachment seats 95 and boss portions 27. Thus, the heat of the heat sink 90 is not easily conducted to the frame 11.

Figure 11:
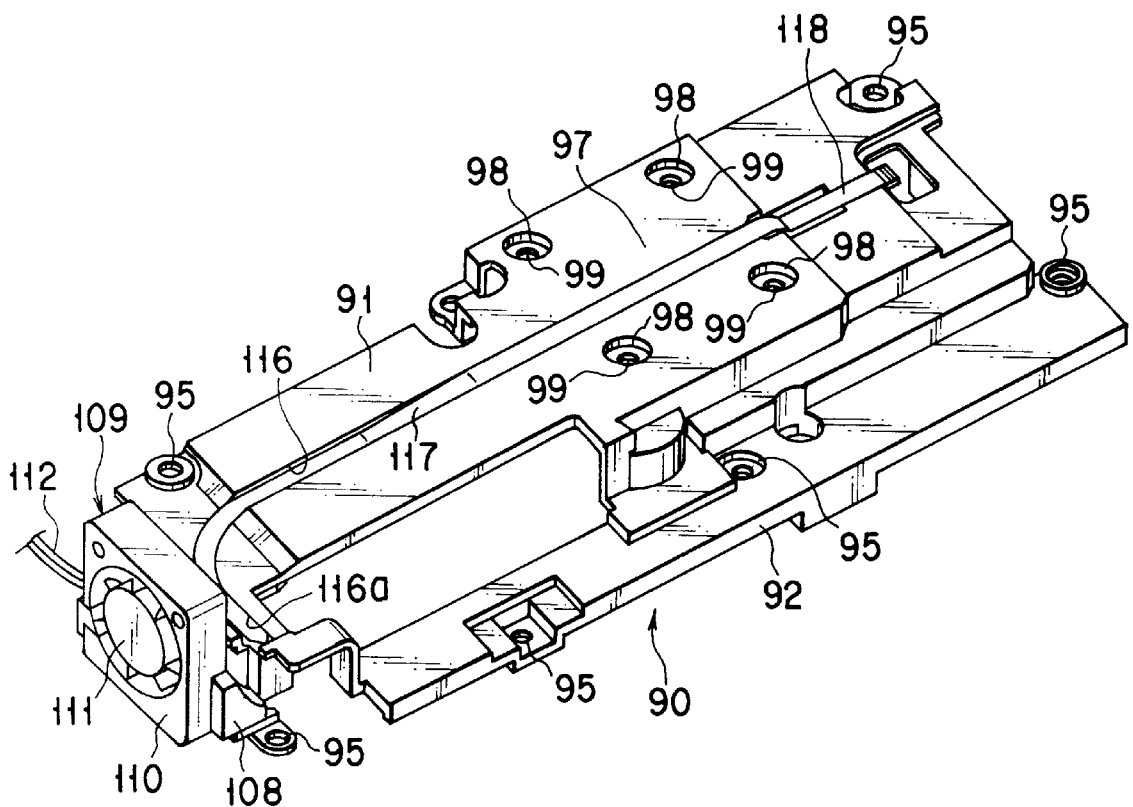
FIG. 11 is a perspective view of the heat sink, showing the positional relationship between a heat pipe and a motor fan.

As is shown in FIGS. 7 and 11, the radiation panel 91 has a heat receiving surface 97. The heat receiving surface 97 faces the upper surface of the cold plate 70. The heat receiving surface 97 has four engaging recess portions 98. The engaging recess portions 98 are associated with the boss portions 76 of cold plate 70, and the boss portions 76 are fitted in the engaging recess portions 98. The engaging recess portions 98 have through-holes 99 respectively. Each through-hole 99 opens to the upper surface of the radiation panel 91 and communicates with the associated screw hole 75 in the cold plate 70. As is shown in FIG. 10, screws 100 are inserted into the through-holes 99 from the above side of the radiation panel 91. The screws 100 are turned into the screw holes 75. Thereby, the radiation panel 91 and the cold plate 70 are coupled to each other.

An elastic sheet 101 having heat conductivity is superposed on the upper surface of the cold plate 70. The elastic sheet 101 is formed of a rubber-like elastic material which is obtained by adding alumina to a silicone resin. The elastic sheet 101 is clamped between the heat receiving surface 97 of radiation panel 91 and the upper surface of cold plate 70 by the tightening of the screws 100. Thus, the upper surface of the cold plate 70 is put in contact with the heat receiving surface 97 of radiation panel 91, with the elastic sheet 101 interposed. As a result, the heat of the IC chip 63 led to the cold plate 70 is efficiently conducted to the radiation panel 91.

As is shown in FIGS. 7 and 10, the upper surface of the radiation panel 91 constitutes a radiation surface 104. The radiation surface 104 is exposed to the inside of the housing body 2. The radiation surface 104 integrally comprises a number of radiation fins 105 and a number of radiation projections 106. A sufficient radiation area of the radiation surface 104 is provided by the presence of the radiation fins 105 and radiation projections 106.

The radiation panel 91 integrally includes a fan support portion 108 at its left-hand end portion. The fan support portion 108 supports a motor fan 109. As is shown in FIG. 11, the motor fan 109 comprises a rectangular fan frame 110 and a rotor 111 supported on the fan frame 110. The fan frame 110 is formed of a metallic material with high heat conductivity, such as an aluminum alloy. An upper end portion of the fan frame 110 is screwed down on the fan support portion 108. Thus, the fan frame 110 is made integrally continuous with the radiation panel 91, with the fan support portion 108 interposed. Accordingly, the fan frame 110 functions substantially as part of the radiation panel 91.

The motor fan 109 is connected to the first circuit board 50 over a lead line 112. Thus, the motor fan 109 is controlled by the control circuit provided on the first circuit board 50. Specifically, in the present embodiment, when the temperature of cover panel 80 measured by the thermistor 85 has exceeded 80° C., the rotor 111 is driven and air is sucked out of the inside of the housing body 2.

The motor fan 109 as well as the heat sink 90 is contained within the housing body 2. The motor fan 109 faces the left-hand side wall 4b of base 4. The side wall 4b has an exhaust port 113 (see FIGS. 2 and 3). When the motor fan 109 is driven, the air in the housing body 2 is exhausted to the outside through the exhaust port 113.

As is shown in FIG. 11, an engaging groove 116 is formed in a lower surface of the radiation panel 91. The engaging groove 116 extends in the longitudinal direction of the radiation panel 91, traversing the heat receiving surface 97. One end of the engaging groove 116 reaches just before the motor fan 109. The engaging groove 116 has an extension 116a continuous with this end of the groove 116. The extension 116a extends toward the rear side of the radiation panel 91 so as to face the motor fan 109.

A heat pipe 117 is tightly fitted in the engaging groove 116. The heat pipe 117 comprises a metallic pipe body 118 in which an operating liquid is sealed. The pipe body 118 is put in contact with the inner surface of the engaging groove 116 over the entire length of the groove 116, and the pipe body 118 is made integral with the radiation panel 91. As is clear from FIG. 11, the depth of the engaging groove 116 is decreased in the region where the groove 116 traverses the heat receiving surface 97. Accordingly, the heat pipe 117 projects slightly from the heat receiving surface 97 in the region corresponding to the heat receiving surface 97. The peripheral surface of the heat pipe 117 is thereby put in pressure contact with the elastic sheet 101. Therefore, such a gap as to prevent heat conduction is not provided between the heat pipe 117 and elastic sheet 101, and the heat of the IC chip 63 led to the cold plate 70 is efficiently conducted to the heat pipe 117.

As is shown in FIG. 7, a second circuit board 120 and a third circuit board 121 are supported on the heat sink 90. The second circuit board 120 is fixed on the upper surface of the flange portion 92a of board support wall 92 and on the upper surface of the support column 93 by means of screws 122. The third circuit board 121 is fixed on the upper end portion of the board support wall 92. Accordingly, the second circuit board 120 and third circuit board 121 are supported on the heat sink 90 such that the two boards 120 and 121 are parallel to the radiation panel 91 and are spaced apart from each other in the thickness direction of the housing body 2.

Figure 12:
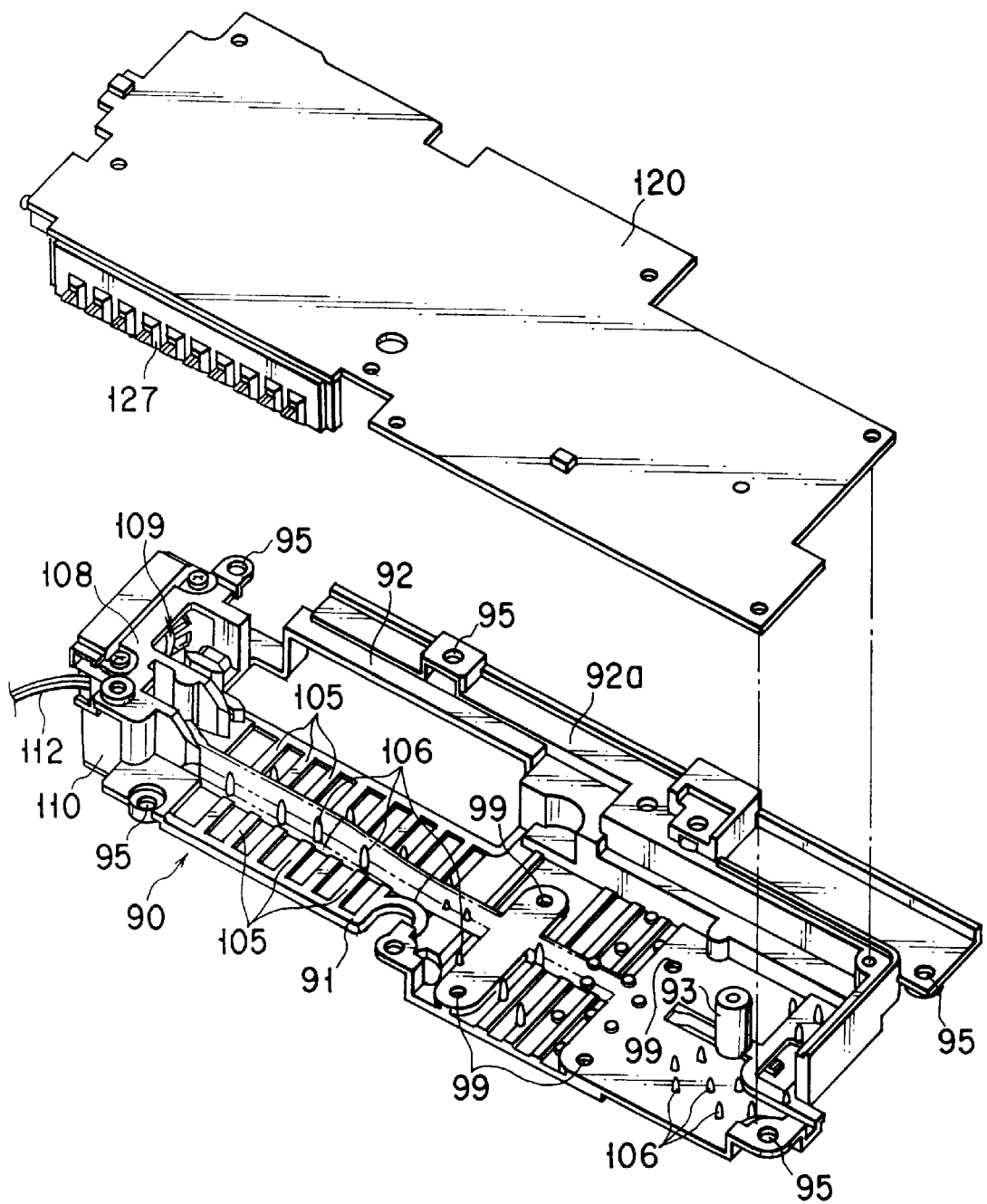
FIG. 12 is a perspective view showing the positional relationship between the heat sink and second circuit board.

As is shown in FIG. 12, the second circuit board 120 has substantially the same size as the radiation panel 91 of heat sink 90. The second circuit board 120 faces the radiation surface 104 of radiation panel 91. The second circuit board 120 cooperates with the radiation surface 104 to form a wind guide passage 125, as shown in FIG. 7. The wind guide passage 125 extends in the width direction of the base 4 behind the battery receptacle 7 and the first section 18 of device storage portion 12. The wind guide passage 125 is located above the space 58 defined between the projecting portion 4e and shield plate 57. The radiation fins 105 and radiation projections 106 are situated in the wind guide passage 125.

A right-hand end portion of the wind guide passage 125 communicates with the inside of the housing body 2 in rear of the first section 18. A left-hand end portion of the wind guide passage 125 communicates with the motor fan 109. When the motor fan 109 is driven, the inside of the wind guide passage 125 is set at a negative pressure level and air flows therethrough.

Exothermic circuit elements 128, such as a coil, a capacitor and a power transistor, and a battery connector 127 are mounted on the lower surface of the second circuit board 120. The exothermic circuit elements 128 are situated in the wind guide passage 125 and are forcibly cooled by the air flowing through the wind guide passage 125. The battery connector 127 is located at a terminal end portion of the battery receptacle 7. The battery pack 9 is electrically connected to the battery connector 127.

Figures 14A, 14B:
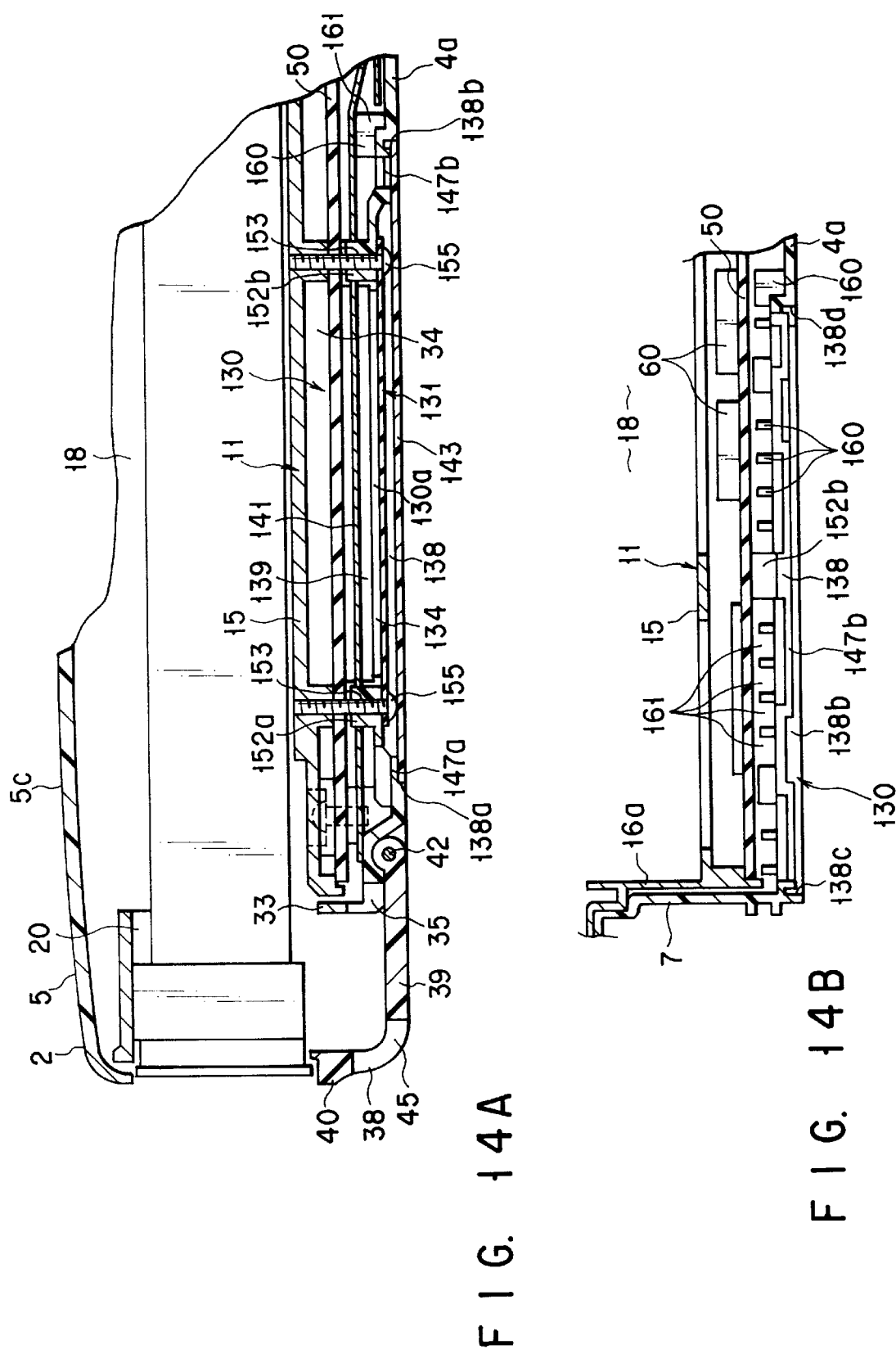
FIG. 14A is a cross-sectional view of the portable computer, showing the state in which a memory card is additionally provided in the card receptacle.
FIG. 14B is a cross-sectional view showing the positional relationship between the card receptacle and a projection.

As is shown in FIGS. 13 and 14A, the housing body 2 has a card receptacle 130. The card receptacle 130 serves to receive an extension memory card 131 as a functional component. The memory card 131 comprises a board 132 formed of a synthetic resin, a plurality of semiconductor chips 133 such as DRAMs mounted on the board 132, and an interface connector 134 situated at one end portion of the board 132. The board 132 has a pair of through-holes 135a and 135b. The through-holes 135a and 135b are located at positions away from the interface connector 134 and are spaced apart from each other in the width direction of the board 132.

As is shown in FIG. 14A, the card receptacle 130 is provided between the bottom wall 4a of base 4 and the first circuit board 50 and is positioned below a front half portion of the first section 18. The card receptacle 130 has an opening portion 138 and a card connector 139. The opening portion 138 is used for inserting/removing the memory card 131 into/from the card receptacle 130. The opening portion 138 is formed in the bottom wall 4a of base 4. As is shown.FIG. 15A, the opening portion 138 has a front edge portion 138a and a rear edge portion 138b both extending in the width direction of the base 4, and a pair of side edge portions 138c and 138d extending in the depth direction of base 4. The front edge portion 138a adjoins the upright wall 33 provided at the front end of the bottom wall 4a. The left-hand side edge portion 138c adjoins the battery receptacle 7. The card connector 139 is supported on the lower surface of the first circuit board 50 and it faces the opening portion 138. When the memory card 131 is contained in the card receptacle 130 from the opening portion 138, the card connector 139 is detachably connected to the interface connector 134.

As is shown in FIGS. 6, 14A and 15A, the lower surface of the first circuit board 50 exposed to the card receptacle 130, except a portion of the lower surface of the board 50 corresponding to the card connector 139, is covered with an insulating sheet 141. The insulating sheet 141 is adhered to the upper surface of the shield plate 57, and a part of the insulating sheet 141 projects to the card receptacle 130.

As is shown in FIG. 13, the opening portion 138 in the bottom wall 4a is covered with a removable cover 143. The cover 143 has a rectangular shape with such a size as to permit tight fitting in the opening portion 138. The cover 143 includes a first end portion having a pair of screw holes 144a and 144b and a second end portion having a pair of engaging portions 145a and 145b.

As is shown in FIG. 15A, the bottom wall 4a has first and second flange portions 147a and 147b. The Few first flange portion 147a is continuous with the front edge portion 138a of the opening portion 138. The second flange portion 147b is continuous with the rear edge portion 138b of the opening portion 138. The first and second flange portions 147a and 147*b* are situated in parallel with the bottom wall 4*a*. The first and second end portions of the cover 143 are superposed on the lower surfaces of the flange portions 147*a* and 147*b*. The first flange portion 147*a* has a pair of engaging holes 148. The engaging holes 148 are associated with the engaging portions 145*a* and 145*b* of cover 143. The engaging portions 145*a* and 145*b* are detachably fitted in the engaging holes 148. The second flange portion 147*b* has a pair of nuts 149. The nuts 149 are embedded in the second flange portion 147*b*. The nuts 149 are associated with the screw holes 144*a* and 144*b* in the cover 143. Screws 150 are inserted into the screw holes 144*a* and 144*b*. As is shown in FIG. 15B, each screw 150 comprising a shank 150*b* with threads 150*a*, and a head 150*c* continuous with the shank 150*b*. The shanks 150*b* of screws 150 are turned into the associated nuts 149 through the screw holes 144*a* and 144*b*. Thereby, the cover 143 is fixed on the bottom wall 4*a*.

As is shown in FIGS. 14A and 15A, the first and second flange portions 147*a* and 147*b* have card support portions 152*a* and 152*b*. The card support portions 152*a* and 152*b* protrude into the opening portion 138. Distal end portions of the card support portions 152*a* and 152*b* are put in contact with an upper surface of a middle portion of the memory card 131. Through-holes 153 are formed in the distal end portions of the card support portions 152*a* and 152*b*. The through-holes 153 correspond to the through-holes 135*a* and 135*b* in the memory card 131.

Screws 155 are passed through the through-holes 135*a* and 135*b* in the memory card 131. As is most clearly shown in FIG. 14A, each screw 155 is turned into the bottom wall 15 of the frame 11 through the through-hole 153 in the associated card support portion 152*a*, 152*b*. Thereby the memory card 131 is held in the card receptacle 130.

As is shown in FIGS. 4, 14B and 15A, a number of rib-shaped projections 160 are integrally formed on the inner surface of the bottom wall 4*a*. The projections 160 extend upward from the inner surface of the bottom wall 4*a*. The projections 160 are linearly arranged at intervals along the rear edge portion 138*a* and right-hand side edge portion 138*d* of the opening portion 138. The projections 160 arranged along the side edge portion 138*d* are opposed to the side portion of the battery receptacle 7. The projections 160 cooperate with the battery receptacle 7 to surround the card receptacle 130. Upper end portions of the projections 160 are put in contact with the insulating sheet 141. Thus, the card receptacle 130 is separated from the inside of the housing body 2 by means of the projections 160 and insulating sheet 141. The inside of the card receptacle 130 is defined as a container space 130*a* independent from the inside of the housing body 2. As a result, the projections 160 and the side portion of the battery receptacle 7 constitute partition walls of the card receptacle 130, and the insulating sheet 141 constitutes a ceiling wall of the card receptacle 130.

The mutually adjacent projections 160 cooperate to constitute a plurality of slit-like communication passages 161. The communication passages 161 make the card receptacle 130 communicate with the inside of the housing body 2. Thus, the communication passages 161 can be regarded as holes formed in side walls of the card receptacle 130. As illustrated in FIGS. 15A and 15B, the width direction W of the communication passage 161 is made less than either the diameter D of the head 150*c* of screw 150 or the entire length T of the shank 150*b*.

In the above structure, if the computer 1 is activated, the IC chip 63 emits heat due to the consumption of power by the TCP 61. Since the IC chip 63 is in contact with the heat receiving surface 72 of cold plate 70, most of the heat of the IC chip 63 is led to the cold plate 70. The upper surface of the cold plate 70 is put in indirect contact with the heat receiving surface 97 of radiation panel 91, with the elastic sheet 101 interposed. Thus, the heat of the IC chip 63 led to the cold plate 70 is conducted to the radiation panel 91. Then, the heat is radiated by natural cooling and dissipated to the inside of the housing body 2 via the radiation surface 104, radiation fins 105 and radiation projections 106 of radiation panel 91.

According to the computer 1 of the present invention, the heat pipe 117 is built in the lower surface of the radiation panel 91 including the heat receiving surface 97. The heat pipe 117 is put in indirect contact with the cold plate 70, with the elastic sheet 101 interposed. Accordingly, 20% to 30% of the heat conducted to the cold plate 70 is absorbed by the heat pipe 117. As a result, the operating liquid sealed in the pipe body 118 evaporates, and the evaporation quickly moves through the pipe body 118 towards the fan support portion 108.

Thus, the heat conducted to the heat receiving surface 97 of radiation panel 91 is forcibly brought via the heat pipe 117 to the fan support portion 108 located far from the heat receiving surface 97. Accordingly, no heat stays locally in the vicinity of the heat receiving surface 97 of radiation panel 91, and the radiation efficiency of the radiation panel 91 is enhanced.

In addition, in the computer 1 according to the present embodiment, the temperature of the IC chip 63 is measured by the thermistor 85 attached to the TCP cover 79. When the measured temperature exceeds 80° C., the motor fan 109 is driven. If the motor fan 109 is driven, the inside of the housing body 2 is set at a negative pressure level, and outside air is sucked into the housing body 2 through the through-holes 45 in the front cover 38, the second vent holes 36 in the bottom wall 4*a*, and the ventholes 55 in the rear wall 5*b*. As is indicated by the arrow in FIG. 6, the air sucked in through the through-holes 45 in the front cover 38 flows into the air passage 34 through the first vent holes 35 formed at the front end portion of the base 4. The air is then guided through the air passage 34 to the heat sink 90 located rearward.

As is indicated by arrows in FIG. 15A, the air sucked in through the second vent holes 36 in the bottom wall 4*a* flows to the air passage 34 through the escape holes 57*a* in the shield plate 57. The air is then guided through the air passage 34 to the heat sink 90 located rearward. In this case, the motor fan 109 is located on the side of the space 58 defined between the projecting portion 4*e* at the rear part of the base 4 and the shield plate 57. Thus, if the motor fan 109 is activated, the air within the space 58 is positively sucked, and this space 58 functions as a kind of vacuum chamber. Since the space 58 communicates with the air passage 34 via the through-holes 59, the air flowing in the air passage 34 is sucked into the space 58 at a time and the flow rate of the air flowing in the air passage 34 increases. As a result, the ventilation of the inside of the housing body 2 is enhanced, and heat does not easily stay in the inside of the housing body 2.

The air guided to the heat sink 90 via the air passage 34 flows into the wind guide passage 125 between the heat radiation surface 104 of radiation panel 91 and the second circuit board 120. Thus, the radiation surface 104, radiation fins 105 and radiation projections 106 are exposed directly to the air flow. The heat conducted to the radiation surface 104 is carried away along with the air flow. Since the wind guide passage 125 is provided between the heat radiation surface 104 and second circuit board 120, the air guided to the heat sink 90 does not dissipate within the housing body 2. Thus, sufficient levels of the flow rate and flow speed of the air flowing in the wind guide passage 125 can be achieved, and the radiation panel 91 can be efficiently cooled.

In addition, since one end portion of the heat pipe 117 reaches just before the motor fan 109, the heat of the IC chip 63 can be efficiently conducted to the vicinity of the motor fan 109. In particular, in a case where the temperature of the IC chip 63 is so high that the motor fan 109 is driven, the heat conducted from the IC chip 63 to the radiation panel 91 can be efficiently carried away to the outside of the housing body 2. Therefore, overheating of the IC chip 63 can be prevented.

According to the above structure, the heat sink 90 is a member separate from the frame 11. The frame 11 and heat sink 90 are spaced apart from each other, except for their portions fixed by the screws. Accordingly, the heat of the IC chip 63 conducted to the heat sink 90 is not easily conducted to the frame 11. Therefore, it is possible to reduce thermal influence upon the first circuit board 50, HDD, and CD-ROM drive 30 or FDD 31 supported on the frame 11.

The first circuit board 50 on which the TCP 61 is mounted generates heat when the computer 1 is activated. The first circuit board 50 is supported on the frame 11 such that the first circuit board 50 covers, from below, the device storage portion 12 and board support portion 13 of the frame 11. Because of this, the heat of the first circuit board 50 is broadly dissipated over the entire frame 11, and the temperature distribution within the housing body 2 can be made uniform. In addition, since the frame 11 is cooled by the air flowing in the housing body 2, the temperatures of the frame 11 as well as the first circuit board 50 can be set at low levels.

In the computer 1 having the above structure, the card receptacle 130 is provided between the first circuit board 50 supported on the frame 11 and the bottom wall 4a of base 4. The card receptacle 130 is situated in the passage of the air sucked into the housing body 2. The card receptacle 130 has side walls formed of a number of projections 160 arranged at intervals. The mutually adjacent projections 160 cooperate to constitute the communication passages 161 for communication between the card receptacle 130 and the inside of the housing body 2. Accordingly, the air, which has been sucked into the housing body 2 through the first vent holes 35 at the front end of base 4 and the second vent holes 36 in the bottom wall 4a of base 4, passes through the card receptacle 130 via the communication passages 161 and flows to the rear part of the housing body 2, without circumventing the card receptacle 130.

Thus, the flow of air in the housing body 2, in particular, in the air passage 34, cannot be prevented or blocked by the card receptacle 130, and the air can be let to flow efficiently over a broad space within the housing body 2, and heat does not stay in the vicinity of the card receptacle 130.

Since air flows in the card receptacle 130, the memory card 131, when contained in the card receptacle 130, can be cooled at the same time. Thus, there is no need to provide a cooling system for exclusive-use by the memory card, and overheating of the memory card 131 can be prevented.

In addition, according to the above structure, the width dimension W of the communication passage 161 is set to be less than either the diameter D of the head 150c of screw 150 or the entire length T of the shank 150b. Even if the screw 150 is accidentally dropped into the card receptacle 130 while the screw 150 is unscrewed to remove the cover 143, the screw 150 is caught by the projection 160 and stays in the card receptacle 130. Thus, even though the card receptacle 130 is made to communicate with the inside of the housing body 2, the screw 150 is prevented from entering the housing body 2. Therefore, undesired short-circuit or line breakage due to the entrance of the screw can be prevented.

Moreover, since the projections 160 are integral with the bottom wall 4a of base 4, a special member for receiving a screw, such as a conventional seal member, is not needed. Thus, the number of parts can be reduced, and a work for attaching the seal member is not needed. Therefore, the assembly of the computer 1 is made easier and the manufacturing cost can be reduced.

The present invention is not limited to the first embodiment. FIG. 16 shows a second embodiment of the invention.

The second embodiment differs from the first embodiment, in particular, with respect to the structure relating to the heat sink 90. In the other respects, the second embodiment is the same as the first embodiment. In the second embodiment, the structural elements common to those in the first embodiment are denoted by like reference numerals and a description thereof is omitted.

As is shown in FIG. 16, the fan frame 110 of motor fan 109 integrally includes a boss portion 200. The boss portion 200 has an insertion hole 201. The boss portion 200 is situated adjacent to the left-hand end portion of the radiation panel 91. The heat pipe 117 has an extension 202. The extension 202 communicates with that end portion of the heat pipe 117, which is located adjacent to the motor fan 109. The extension 202 is inserted in the insertion hole 201 in the boss portion 200 from the left-hand end of the radiation panel 91.

According to this structure, the fan frame 110 is directly cooled by the rotation of the rotor 111, and the radiation properties of the fan frame 110 are very high. Thus, the heat conducted from the heat pipe 117 to the fan frame 110 can be efficiently dissipated to the outside of the housing body 2. Therefore, the radiation properties of the radiation panel 91 and, accordingly, the TCP 61 can be further enhanced.

The receptacle within the housing body is not limited to a card receptacle for containing the memory card, but it may be a receptacle for containing a pack-shaped device such as a battery pack or a CD-ROM drive.

The opening portion communicating with the receptacle may not necessarily be formed in the bottom wall of the housing body. It may be formed in a side wall or a top wall of the housing body.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

I claim:

1. An information processing apparatus comprising:

a housing having an opening portion;

a receptacle formed within the housing;

a functional component removably contained in the receptacle when placed through the opening portion; and a cover closing the opening portion and covering the functional component, wherein said housing has a number of projections that protrude from an inner surface of the housing toward the receptacle and are arranged at intervals along a periphery of the opening portion so as to define communication passages between the receptacle and the housing.

2. The information processing apparatus according to claim 1, wherein said cover is detachably attached to the housing by means of screws, each of the screws comprising a shank with threads, and a head continuous with the shank, each of the intervals between adjacent ones of the projections being less than the diameter of the head and less than the entire length of the shank.

3. The information processing apparatus according to claim 1, further comprising a circuit board contained within the housing and facing the opening portion.

4. The information processing apparatus according to claim 3, wherein said housing has a plurality of vent holes, and said circuit board has a circuit element which emits heat in operation.

5. The information processing apparatus according to claim 4, further comprising a motor fan contained within the housing, said motor fan sucking air into the housing and exhausting the air to the outside of the housing through said vent holes.

6. The information processing apparatus according to claim 3, wherein said functional component is an extension card comprising a board and a plurality of semiconductor chips mounted on the board, said extension card being contained in the receptacle such that said board is in parallel to said circuit board.

7. The information processing apparatus according to claim 6, wherein said circuit board has a surface exposed to the receptacle, said surface is covered with an electrically insulating sheet, and said sheet is in contact with distal end portion of said projections.

8. An information processing apparatus comprising:
a housing in which a plurality of vent holes are formed;
a receptacle provided within the housing and having a reception space and a number of projections, said projections protruding from an inner surface of the housing and being arranged at intervals along a periphery of the reception space so as to define communication passages between the reception space of the receptacle and an inside space of the housing;
a functional component contained in said reception space of the receptacle; and
a motor fan contained within said housing, said motor fan sucking air into the inside space of the housing through the vent holes.

9. The information processing apparatus according to claim 8, wherein said housing has a bottom wall, said bottom wall has an opening portion through which said functional component is inserted/removed in/from the reception space of the receptacle, and said opening portion is covered with a detachable cover.

10. The information processing apparatus according to claim 9, further comprising a circuit board contained within the housing, said circuit board forming an air passage between itself and said bottom wall of the housing, said receptacle being situated in said air passage, and said vent holes, and said motor fan being continuous with the air passage.

11. The information processing apparatus according to claim 10, wherein said circuit board has a circuit element which emits heat in operation, and said circuit element is situated in said air passage.

12. The information processing apparatus according to claim 10, wherein said functional component is an extension card comprising a board and a plurality of semiconductor chips mounted on the board, said extension card being contained in the receptacle such that said board is in parallel to said circuit board.

13. An information processing apparatus comprising:
a housing having an opening portion;
a receptacle provided within the housing, said receptacle communicating with the opening portion and having a number of projections which protrude from an inner surface of the housing toward the receptacle and are arranged at intervals along a periphery of the opening portion;
a functional component removably contained in the receptacle when placed through the opening portion;
a cover closing the opening portion and covering the functional component; and
screws detachably attaching the cover to the housing, each of said intervals between adjacent ones of the projections being shorter than the dimension of the screws.

14. The information processing apparatus according to claim 13, wherein each of said screws comprises a shank with threads, and a head continuous with the shank, said adjacent ones of the projections cooperate to constitute communication passages whose dimension is less than the diameter of the head and less than the entire length of the shank.

15. The information processing apparatus according to claim 13, further comprising:
a circuit board contained within the housing, said circuit board having a circuit element which emits heat in operation; and
a motor fan, contained within the housing, for forcibly air-cooling the circuit element.

16. The information processing apparatus according to claim 15, wherein said housing includes a bottom wall in which said opening portion is formed, said circuit board forms an air passage between itself and said bottom wall, said air passage communicates with the motor fan, and said receptacle is situated in said air passage.

17. An information processing apparatus comprising;
a housing having an opening portion;
a circuit board contained within a reception space defined within the housing and facing the opening portion;
a functional component inserted into the housing by being placed through the opening portion and electrically connected to the circuit board;
a number of projections protruding from an inner surface of the housing toward the circuit board and being arranged at intervals along a periphery of the opening portion so as to define communication passages between the reception space and an inside space of the housing; and
a cover closing the opening portion and covering the functional component.

* * * * *

UNITED STATES PATENT AND TRADEMARK OFFICE
CERTIFICATE OF CORRECTION

PATENT NO. : 6,043,977
DATED : March 28, 2000
INVENTOR : Yuji NAKAJIMA

It is certified that error appears in the above-identified patent and that said Letters Patent is hereby corrected as shown below:

\* Title Page, Item [57], in the Abstract, line 8, after "housing", delete "body".

\* Claim 10, Column 17, line 63, after "holes", delete ",".

Claim 17, Column 18, line 47, "comprising;" should read --comprising:--.

Signed and Sealed this

Tenth Day of April, 2001

*Attest:*

NICHOLAS P. GODICI

*Attesting Officer*  *Acting Director of the United States Patent and Trademark Office*